(12) United States Patent
Kunieda et al.

(10) Patent No.: US 9,189,681 B2
(45) Date of Patent: Nov. 17, 2015

(54) IMAGE PROCESSING APPARATUS, METHOD THEREOF, AND COMPUTER-READABLE STORAGE MEDIUM

(71) Applicant: CANON KABUSHIKI KAISHA, Tokyo (JP)

(72) Inventors: Hiroyasu Kunieda, Yokohama (JP); Tetsuya Suwa, Yokohama (JP); Takashi Nakamura, Yokohama (JP); Takashi Fujita, Kawasaki (JP); Kiyoshi Umeda, Kawasaki (JP); Yusuke Hashii, Tokyo (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/921,774

(22) Filed: Jun. 19, 2013

(65) Prior Publication Data

US 2014/0010415 A1    Jan. 9, 2014

(30) Foreign Application Priority Data

Jul. 9, 2012    (JP) .................................. 2012-154009

(51) Int. Cl.
  *G06K 9/00*    (2006.01)
(52) U.S. Cl.
  CPC ........ *G06K 9/00288* (2013.01); *G06K 9/00268* (2013.01); *G06K 9/00926* (2013.01); *G06K 2009/00322* (2013.01); *G06K 2009/00328* (2013.01)
(58) Field of Classification Search
  CPC .......... G06K 9/00288; G06K 9/00322; G06K 9/00268

USPC ......................................................... 382/118
See application file for complete search history.

(56) References Cited

U.S. PATENT DOCUMENTS

| 5,287,439 A | 2/1994 | Koga et al. |
| 5,673,067 A | 9/1997 | Ogawa et al. |
| 5,677,725 A | 10/1997 | Honbo et al. |
| 6,023,716 A | 2/2000 | Fujita et al. |

(Continued)

FOREIGN PATENT DOCUMENTS

| JP | 05-197793 A | 8/1993 |
| JP | 08-063597 A | 3/1996 |

(Continued)

OTHER PUBLICATIONS

U.S. Appl. No. 13/922,802, filed Jun. 20, 2013 to Suwa et al.

*Primary Examiner* — Utpal Shah
(74) *Attorney, Agent, or Firm* — Fitzpatrick, Cella, Harper & Scinto

(57) ABSTRACT

An image processing apparatus comprises, a management unit configured to classify a face feature information of a face region of an object extracted from image data into a predetermined category in accordance with a similarity determination, and manage the face feature information in a dictionary, a condition setting unit configured to set category determination conditions for classifying the face feature information into the category in accordance with individual information representing at least one of an age and sex of the object and a determination unit configured to determine, based on the category determination conditions set by the condition setting unit, a category to which the face feature information belongs in the dictionary.

24 Claims, 34 Drawing Sheets

(56) References Cited

U.S. PATENT DOCUMENTS

| | | | |
|---|---|---|---|
| 6,065,025 | A | 5/2000 | Fujita et al. |
| 6,181,805 | B1 * | 1/2001 | Koike et al. .................. 382/118 |
| 6,608,926 | B1 | 8/2003 | Suwa et al. |
| 6,694,051 | B1 | 2/2004 | Yamazoe et al. |
| 6,885,760 | B2 | 4/2005 | Yamada et al. |
| 6,895,103 | B2 | 5/2005 | Chen et al. |
| 6,965,684 | B2 | 11/2005 | Chen et al. |
| 7,103,218 | B2 | 9/2006 | Chen et al. |
| 7,167,205 | B2 | 1/2007 | Akiyama et al. |
| 7,432,985 | B2 | 10/2008 | Ishikawa et al. |
| 7,738,030 | B2 | 6/2010 | Akiyama et al. |
| 7,924,469 | B2 | 4/2011 | Ono et al. |
| 7,944,588 | B2 | 5/2011 | Yamada et al. |
| 7,983,528 | B2 | 7/2011 | Sohma et al. |
| 8,175,155 | B2 | 5/2012 | Suwa et al. |
| 8,184,337 | B2 | 5/2012 | Sakai |
| 8,237,991 | B2 | 8/2012 | Ono et al. |
| 8,405,876 | B2 | 3/2013 | Nakatani et al. |
| 8,705,875 | B1 * | 4/2014 | Ricanek, Jr. .................. 382/224 |
| 2001/0036298 | A1 | 11/2001 | Yamada et al. |
| 2002/0081032 | A1 | 6/2002 | Chen et al. |
| 2003/0016846 | A1 | 1/2003 | Chen et al. |
| 2006/0018517 | A1 | 1/2006 | Chen et al. |
| 2006/0193502 | A1 * | 8/2006 | Yamaguchi .................. 382/118 |
| 2007/0003140 | A1 * | 1/2007 | Yamada et al. ............... 382/181 |
| 2007/0177807 | A1 * | 8/2007 | Enomoto ...................... 382/224 |
| 2008/0304699 | A1 * | 12/2008 | Yuasa ........................... 382/100 |
| 2009/0034840 | A1 | 2/2009 | Umeda et al. |
| 2009/0087038 | A1 * | 4/2009 | Okada et al. .................. 382/118 |
| 2010/0097642 | A1 | 4/2010 | Sumi |
| 2010/0260415 | A1 | 10/2010 | Sakai et al. |
| 2010/0295998 | A1 | 11/2010 | Sakai et al. |
| 2011/0109923 | A1 | 5/2011 | Umeda et al. |
| 2011/0285871 | A1 | 11/2011 | Sakai |
| 2012/0014453 | A1 | 1/2012 | Kawai et al. |
| 2012/0014565 | A1 | 1/2012 | Akiyama et al. |
| 2012/0268759 | A1 | 10/2012 | Ono et al. |
| 2012/0314957 | A1 * | 12/2012 | Narikawa ...................... 382/195 |
| 2014/0334734 | A1 * | 11/2014 | Xiong ........................... 382/195 |

FOREIGN PATENT DOCUMENTS

| | | |
|---|---|---|
| JP | 08-077334 A | 3/1996 |
| JP | 2541688 B | 7/1996 |
| JP | 11-053525 A | 2/1999 |
| JP | 11-203415 A | 7/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 3469031 B2 | 11/2003 |
| JP | 2009-271885 A | 11/2009 |
| JP | 2010-251999 A | 11/2010 |
| JP | 2010-273144 A | 12/2010 |

* cited by examiner

FIG. 10

| SENSING CLASSIFICATION | SENSING SUB-CLASSIFICATION | DATA TYPE | VALUE |
|---|---|---|---|
| BASIC IMAGE FEATURE AMOUNT | AVERAGE LUMINANCE | int | 0~255 |
|  | AVERAGE SATURATION | int | 0~255 |
|  | AVERAGE HUE | int | 0~359 |
| FACE DETECTION | NUMBER OF PERSON'S FACES | int | 0~MAXFACE |
|  | COORDINATE POSITION | int * 8 | 0~Width or Height |
|  | AVERAGE Y IN FACE REGION | int | 0~255 |
|  | AVERAGE Cb IN FACE REGION | int | -128~127 |
|  | AVERAGE Cr IN FACE REGION | int | -128~127 |
| SCENE ANALYSIS | SCENE RESULT | char | Landscape<br>Nightscape<br>Portrait<br>Underexposure<br>Others |
|  |  |  |  |

FIG. 11

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

F I G. 12

| CLASSIFICATION | CONTENTS | DATA TYPE | VALUE |
|---|---|---|---|
| IMAGE | FAVORITE RATE | int | 0~5 |
| | EVENT | char | "travel" "graduation" "wedding" |
| | | | |
| PERSON | NAME | char | "NAME" |
| | BIRTHDAY | char | YYYYMMDD |
| | FAMILY RELATIONSHIP | char | "family" "" |
| | | | |

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

F I G. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 23
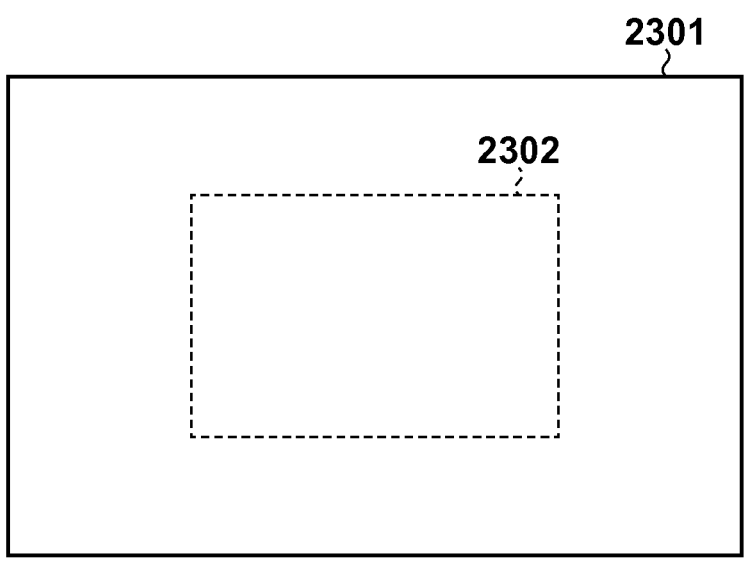

FIG. 24

| CATEGORY | CONTENTS | SCORE RANGE | DEGREE OF IMPORTANCE FOR EACH THEME(WEIGHT W) | | |
|---|---|---|---|---|---|
| | | | growth | travel | ... |
| INDIVIDUAL IMAGE EVALUATION | BRIGHTNESS APPROPRIATENESS | 0~100 | 0.5 | 1.0 | |
| | SATURATION APPROPRIATENESS | 0~100 | 0.5 | 1.0 | |
| IMAGE/SLOT MATCHING EVALUATION | PERSON MATCHING | 0~100 | 1.0 | 0.5 | |
| | TRIMMING LOSS DETERMINATION | 0~100 | 1.0 | 0.5 | |
| IN-PAGE BALANCE EVALUATION | IMAGE SIMILARITY | 0~100 | 0.5 | 1.0 | |
| | TONE VARIATION | 0~100 | 0.5 | 1.0 | |
| | FACE SIZE VARIATION | 0~100 | 0.5 | 1.0 | |
| OTHERS | USER TASTE | 0~100 | 0.8 | 0.8 | |

| IMAGE ID | CAPTURING DATE & TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

FIG. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

FIG. 31

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

F I G. 32

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingRatio>50.0</TrimingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingRatio>38.0</TrimingRatio>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingRatio>53.0</TrimingRatio>
        </ImageSlot>
        .......

</LayoutInfo>
```

FIG. 34

| ID (3401) | CATEGORY (3402) | FACE FEATURE AMOUNT GROUP (3404) |
|---|---|---|
| 1 | 1 | ▨ ▨ ▨ |
| 1 | 2 | ▨ ▨ ▨ ▨ ~3403 |
| 1 | 3 | ▨ |
| 1 | 4 | ▨ ▨ |
| 2 | 1 | ▨ ▨ |
| 2 | 2 | ▨ ▨ ▨ |
| ⋮ | ⋮ | ⋮ |
|  |  |  |

F I G. 38
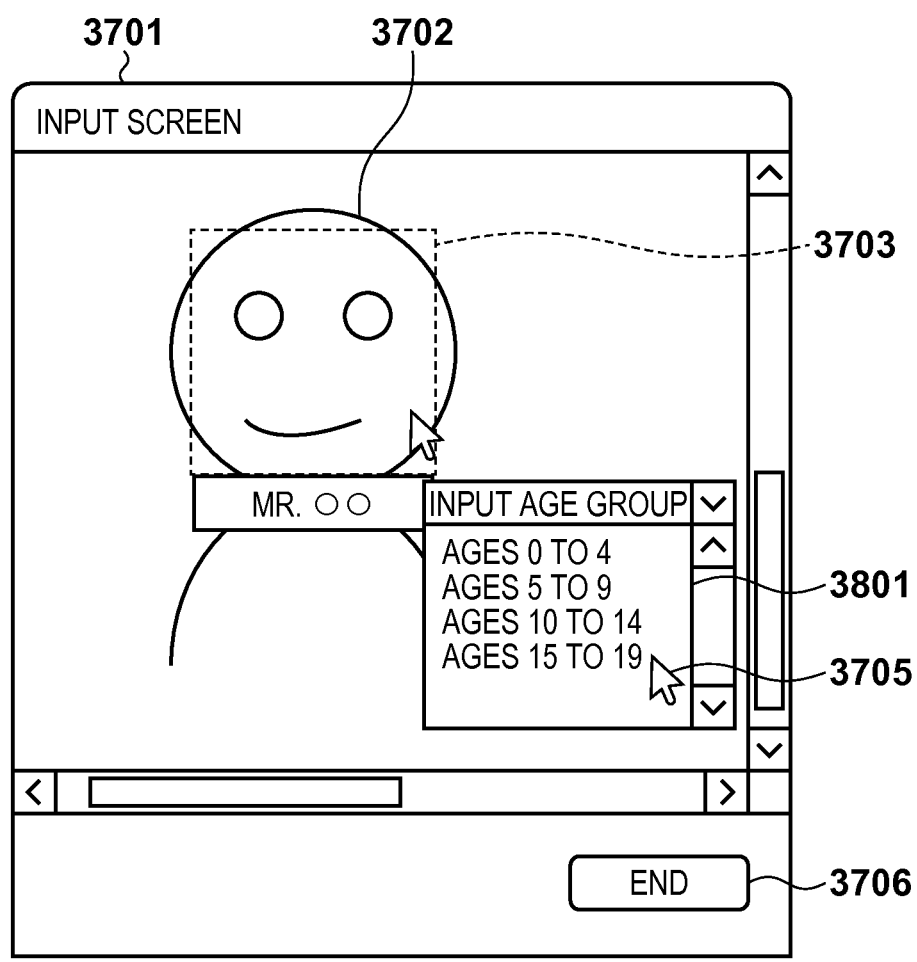

IMAGE PROCESSING APPARATUS, METHOD THEREOF, AND COMPUTER-READABLE STORAGE MEDIUM

BACKGROUND OF THE INVENTION

1. Field of the Invention

The present invention relates to an image processing technique of detecting and managing the face region of an object in image data.

2. Description of the Related Art

As digital still cameras (to be also referred to as "DSCs" hereinafter) become popular, image data that numbers as many as several thousands or several tens of thousands need to be handled nowadays. As one especially important technique for the handling method, personal recognition is implemented by handling images based on a person's face. For example, a face region included in an input image is detected in advance, information (to be referred to as a "feature amount" hereinafter) obtained by analyzing the detected face image is extracted, and the extracted feature amount is registered. Note that the feature amount to be registered increases in accordance with the number of images to be analyzed and the number of faces included in an image. A database in which a plurality of feature amounts are registered will be called a "dictionary" or "face dictionary". Personal recognition becomes possible by collating an obtained face dictionary with a feature amount obtained by analyzing a newly input image.

Japanese Patent Laid-Open No. 11-203415 has proposed a method of categorizing a feature amount in a dictionary. First, learning samples of patterns necessary to create an identification dictionary are prepared in advance, and similar patterns are categorized. Then, the category is subdivided to reduce a recognition error within the created category of similar patterns. After the subdivision, subdivided similar categories are integrated. Based on the categorization result, a feature amount is registered in the dictionary.

However, in the similar pattern category identification dictionary creation apparatus disclosed in Japanese Patent Laid-Open No. 11-203415, similar patterns are not categorized for each object, and the recognition accuracy may become poor depending on an object.

SUMMARY OF THE INVENTION

The present invention provides an image processing technique of creating a dictionary capable of high-accuracy recognition processing corresponding to individual information of an object.

To achieve the above object, an image processing apparatus according to the present invention comprises the following arrangement.

That is, an image processing apparatus comprises: a management unit configured to classify face feature information of a face region of an object extracted from image data into a predetermined category in accordance with a similarity determination, and manage the face feature information in a dictionary; a condition setting unit configured to set category determination conditions for classifying the face feature information into the category in accordance with individual information representing at least one of an age and sex of the object; and a determination unit configured to determine, based on the category determination conditions set by the condition setting unit, a category to which the face feature information belongs in the dictionary.

According to the present invention, a dictionary capable of high-accuracy recognition processing corresponding to individual information of an object can be created.

Further features of the present invention will become apparent from the following description of exemplary embodiments (with reference to the attached drawings).

BRIEF DESCRIPTION OF THE DRAWINGS

FIG. 10 is a table showing an example of attribute information obtained by image analysis;

FIG. 11 is a view showing an example of an image analysis result save format;

FIG. 12 is a table showing an example of attribute information that can be manually input by a user;

FIG. 18 is a view showing an example of the hold format of the layout template shown in FIG. 17;

FIG. 20 is a view showing an example of the hold format of the layout template shown in FIG. 19;

FIG. 23 is a view showing an example of automatic trimming processing;

FIG. 24 is a table showing an example of layout evaluation values when performing automatic layout;

FIG. 30 is a view showing an example of holding a decided theme and main character information;

FIG. 31 is a view showing an example of holding a decided theme and main character information;

FIG. 32 is a view showing an example of holding generated automatic layout information;

FIG. 34 is a view for explaining the internal arrangement of a face dictionary;

FIG. 38 is a view showing an example of the UI of an age setting screen; and

DESCRIPTION OF THE EMBODIMENTS

Embodiments of the present invention will now be described in detail with reference to the accompanying drawings.

First Embodiment

The first embodiment of the present invention will be described to automatically generate a layout output by using an input image group. This merely exemplifies a form of implementation, and the present invention is not limited to the following embodiment.

Figure 1:
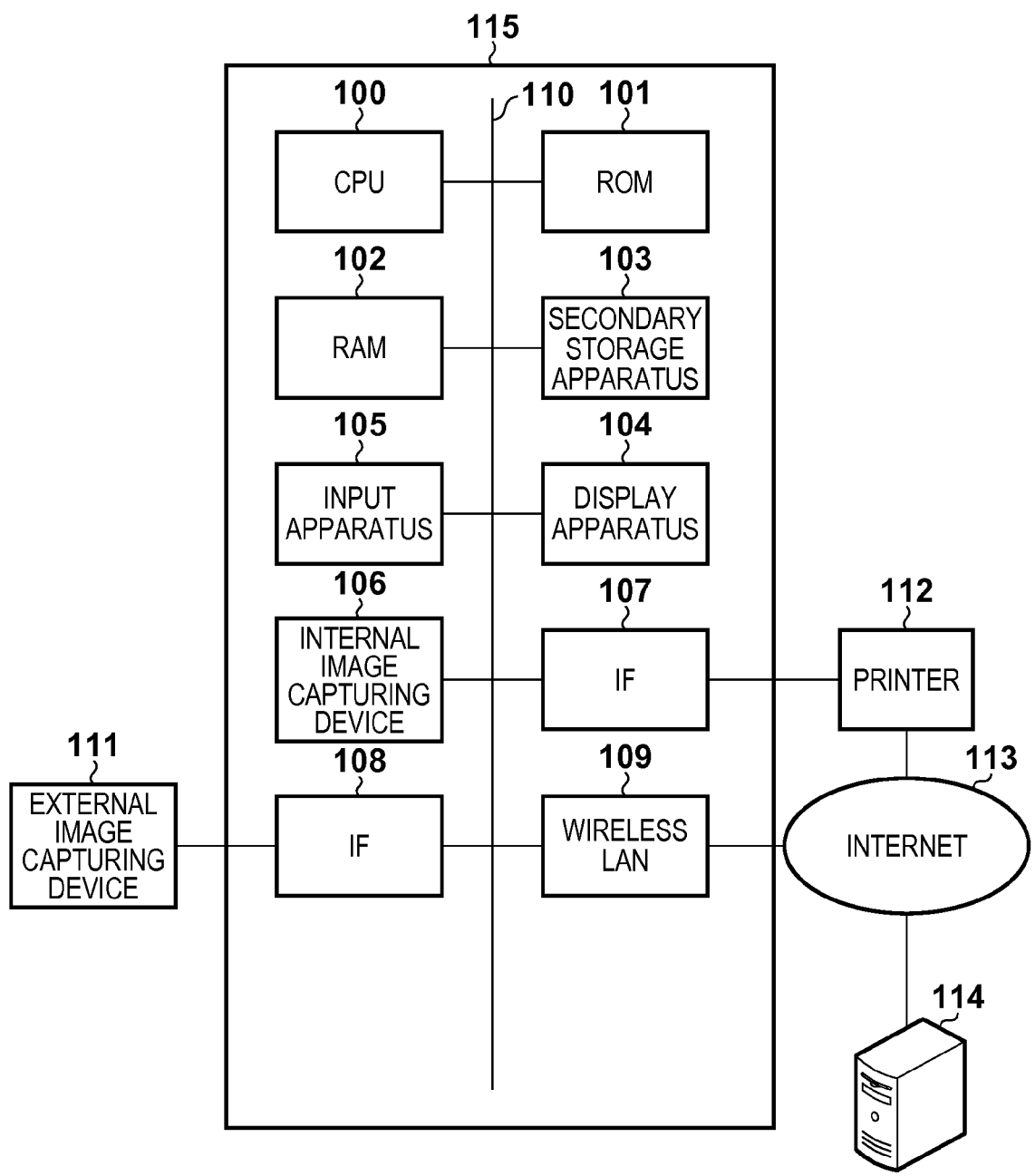
FIG. 1 is a block diagram showing the hardware arrangement of an image processing apparatus.

FIG. 1 is a block diagram showing an example of the hardware arrangement of an image processing apparatus according to the first embodiment.

In FIG. 1, an image processing apparatus 115 includes a CPU (Central Processing Unit) 100, ROM 101, RAM 102, a secondary storage apparatus 103, a display apparatus 104, an input apparatus 105, IF 107, IF 108, and a wireless LAN (Local Area Network) 109. Further, the image processing apparatus 115 includes an internal image capturing device 106. These units are connected to each other by a control bus/data bus 110. The image processing apparatus 115 according to the embodiment is implemented by an information processing apparatus.

The image processing apparatus 115 is, for example, a computer 115. The CPU 100 executes information processing to be described in the first embodiment in accordance with programs such as an application. The CUP 101 loads a program stored in a hard disk or the like to a RAM 102 and runs the program on the RAM 102, thereby controlling of the entire image arrangement control apparatus according to the present embodiment. The ROM 101 stores programs to be executed by the CPU 100. The RAM 102 provides a memory to temporarily store various kinds of information when the CPU 100 executes the programs. The secondary storage apparatus 103 is a hard disk or the like and serves as a storage medium to save, for example, a database that saves image files and image analysis results. The display apparatus 104 is, for example, a display and is an apparatus which presents, to the user, various kinds of UIs (User Interfaces) to be described below, including a processing result in the embodiment. The display apparatus 104 may have a touch panel function. The control bus/data bus 110 connects the above-described units to the CPU 100. The image processing apparatus 115 also includes the input apparatus 105 such as a mouse or keyboard used by a user to input an image correction processing instruction and the like.

The image processing apparatus 115 may include the internal image capturing device 106. An image captured by the internal image capturing device 106 undergoes predetermined image processing and is saved in the secondary storage apparatus 103. The image processing apparatus 115 may load an image from an external image capturing device 111 connected via an interface (IF 108). The image processing apparatus 115 also includes the wireless LAN 109, which is connected to Internet 113. The image processing apparatus 115 can also acquire image data from an external server 114 connected to the Internet 113.

A printer 112 for outputting an image and the like is connected to the image processing apparatus 115 via the IF 107. The printer 112 is further connected to the Internet and can exchange print data via the wireless LAN 109.

Figure 2:
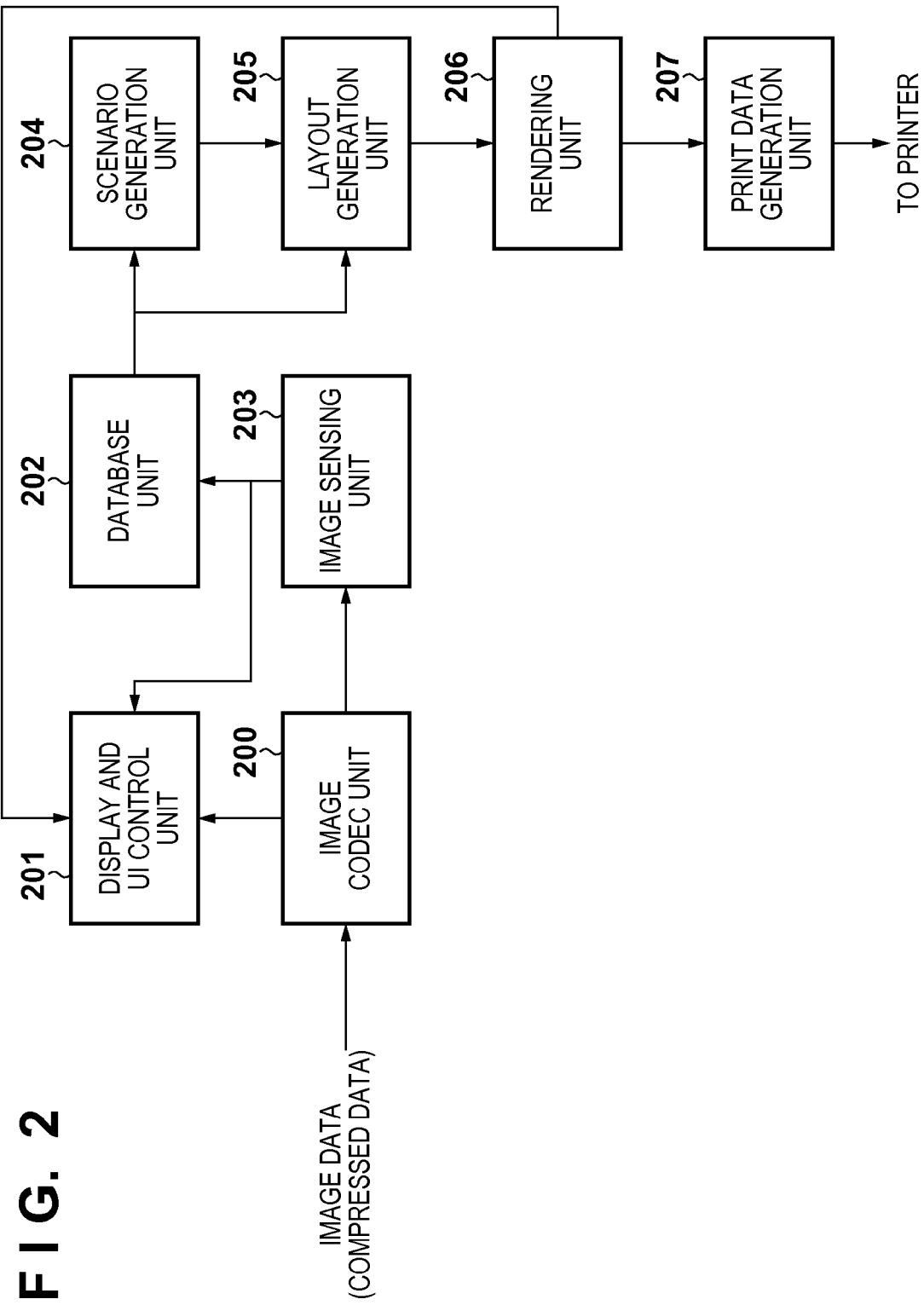
FIG. 2 is a block diagram showing software for controlling the image processing apparatus.

FIG. 2 is a block diagram showing a software arrangement including the above-described application according to the first embodiment.

Image data acquired by the image processing apparatus 115 is normally compressed in a compression format such as JPEG (Joint Photography Expert Group). Hence, an image codec unit 200 decompresses image data based on the compression format and converts it into image data (bitmap data) in a so-called RGB dot-sequential bitmap data format. The converted bitmap data is transferred to a display and UI control unit 201 and displayed on the display apparatus 104 such as a display.

The bitmap data is further input to an image sensing unit 203 (application), and undergoes various analysis processes (details will be described later) by the image sensing unit 203. Various kinds of attribute information of the image obtained by the analysis processing are stored in the secondary storage apparatus 103 by a database unit 202 (application) in accordance with a predetermined format. Note that image analysis processing and sensing processing will be handled in the same sense.

A scenario generation unit 204 (application) generates the conditions of a layout to be automatically generated in accordance with various conditions input by the user, details of which will be described later. A layout generation unit 205 performs processing of automatically generating a layout for arranging image data in accordance with the generated scenario.

A rendering unit 206 renders the generated layout into bitmap data for display. The bitmap data serving as the rendering result is transmitted to the display and UI control unit 201, and its contents are displayed on the display apparatus 104. The rendering result is also transmitted to a print data generation unit 207, and the print data generation unit 207 converts it into printer command data and transmits the command to the printer 112.

The flowchart of basic image processing according to the embodiment will be described with reference to FIGS. 3 to 6.

Figure 3:
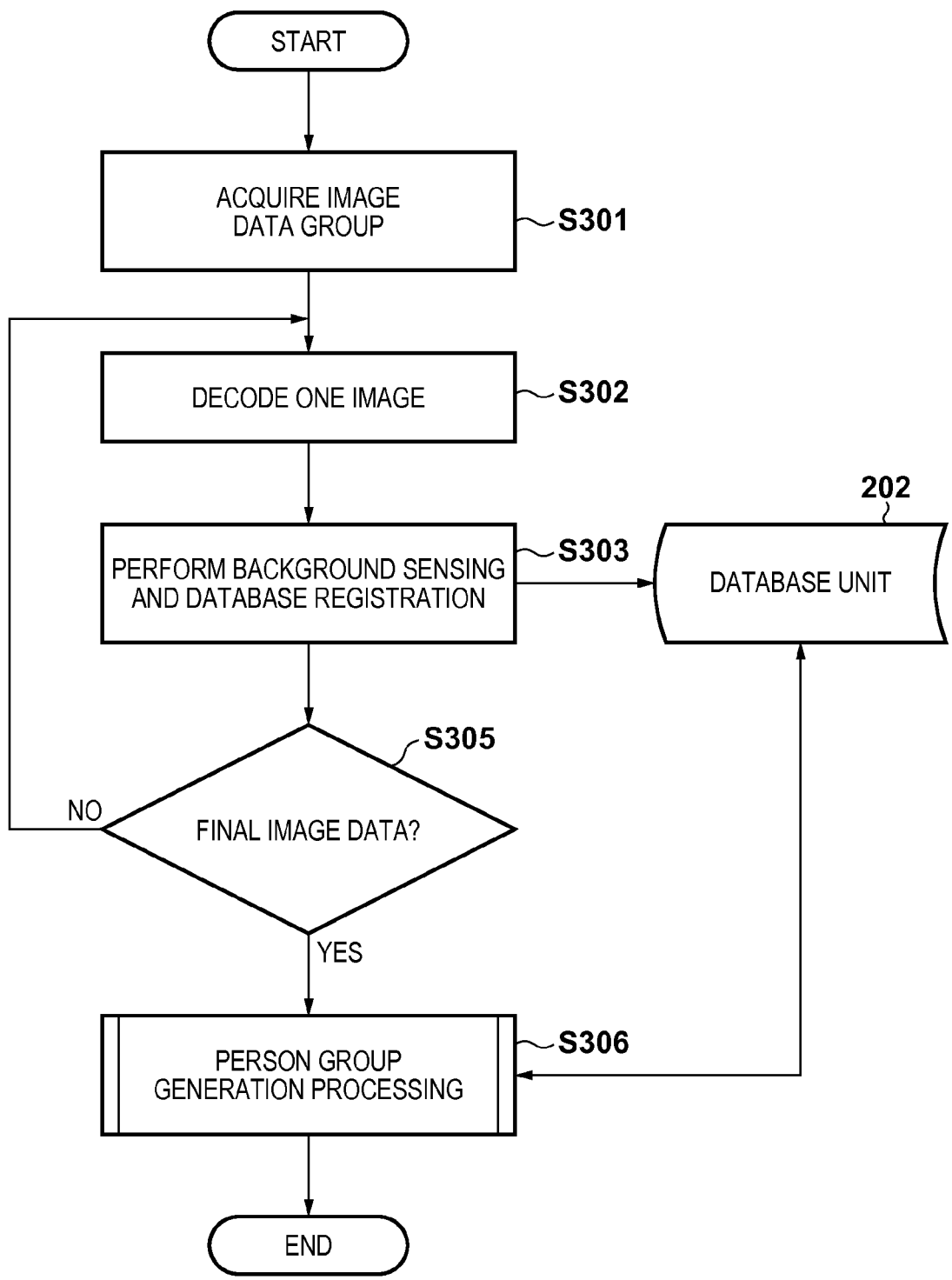
FIG. 3 is a flowchart of image analysis processing.
Figure 4:
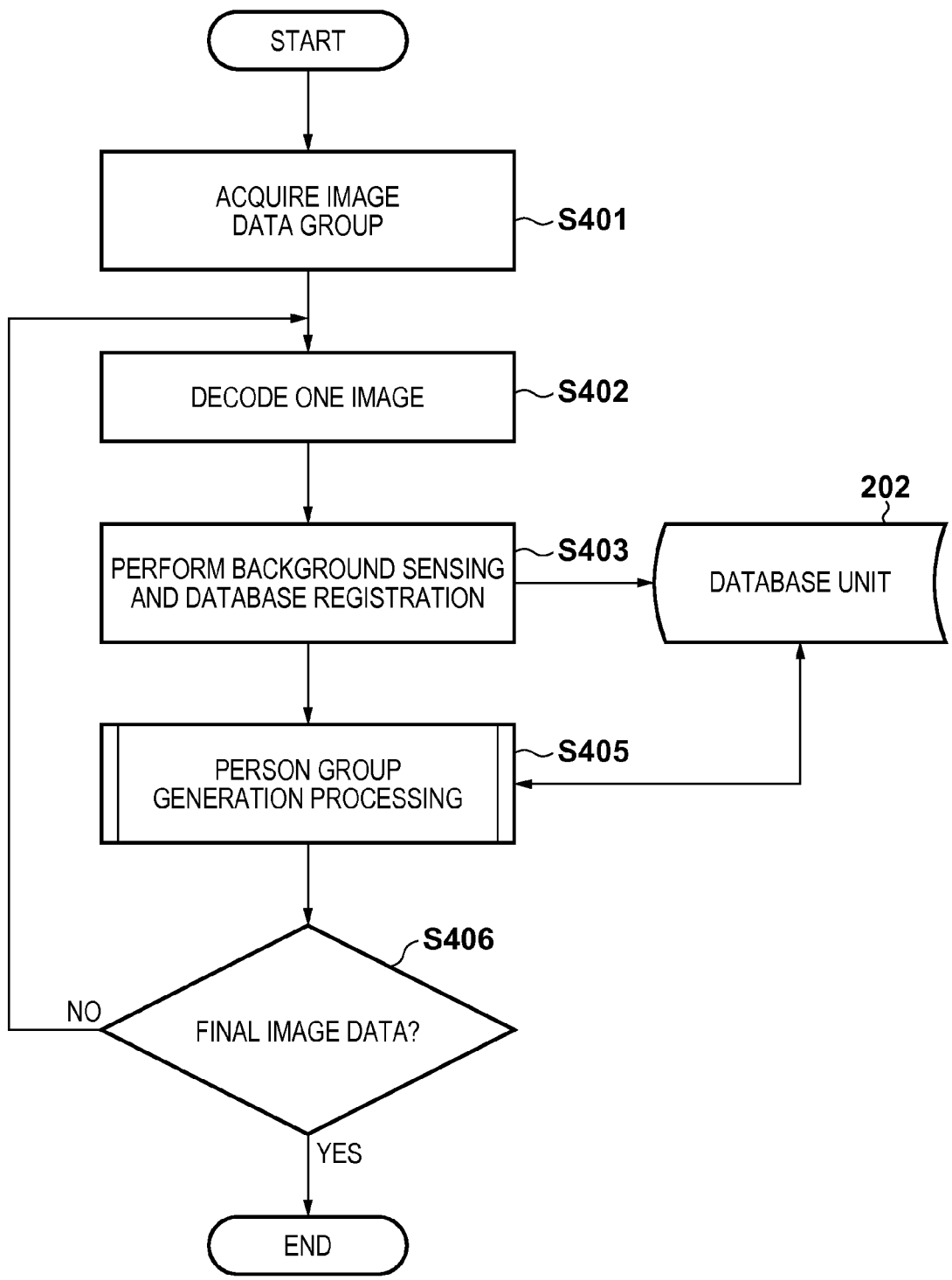
FIG. 4 is a flowchart of image analysis processing.

FIGS. 3 and 4 are flowcharts each showing processing to be executed by the image sensing unit 203. FIGS. 3 and 4 each show processing of acquiring a plurality of image data groups, performing analysis processing for each image data group, and storing the result in the database unit 202.

Figure 5:
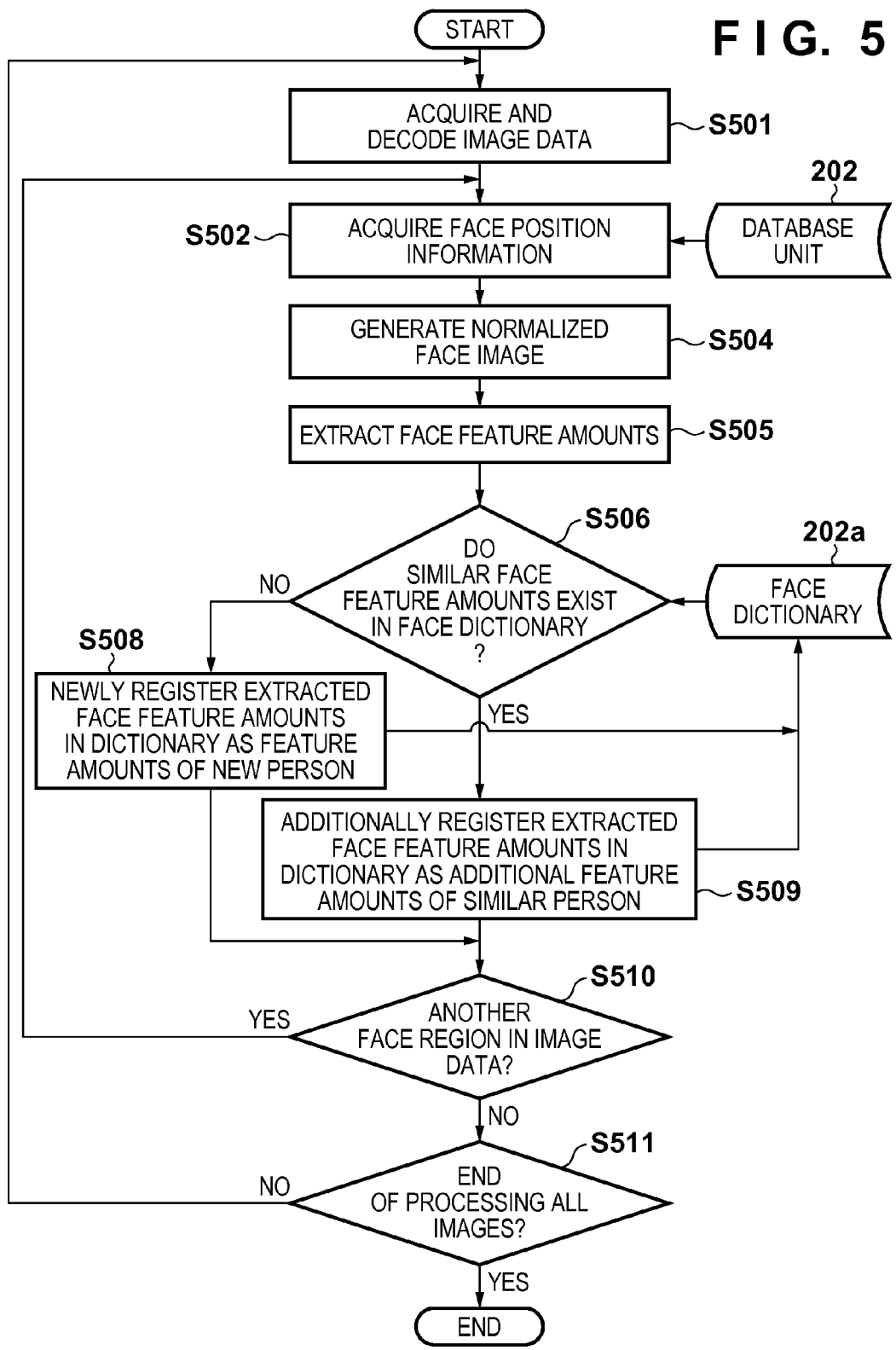
FIG. 5 is a flowchart of person group generation processing.

FIG. 5 shows person group generation processing of grouping face information supposed to be of the same person based on detected face position information.

Figure 6:
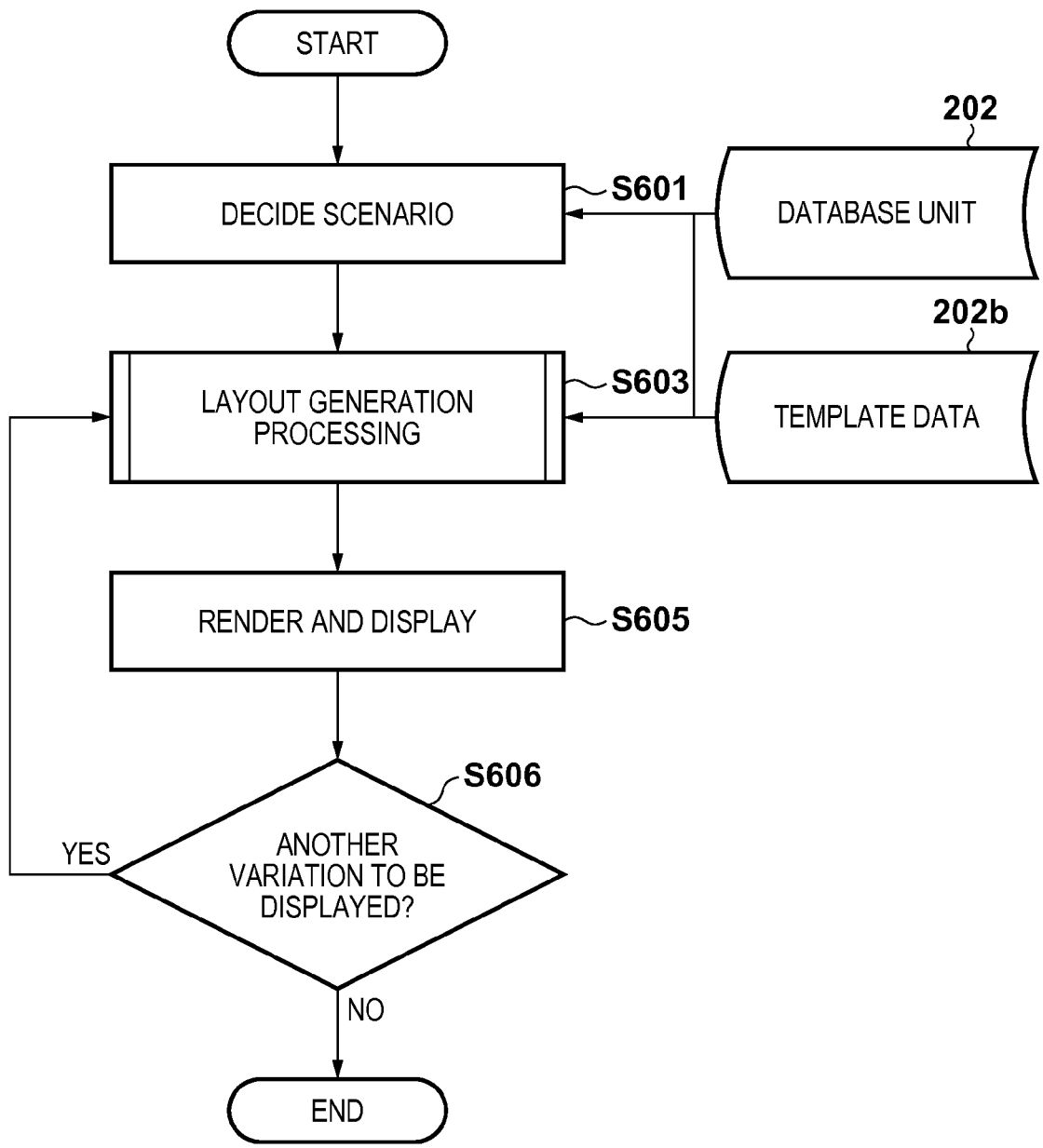
FIG. 6 is a flowchart of automatic layout proposal processing.

FIG. 6 shows processing of deciding a scenario for layout creation based on image analysis information and various kinds of information input by the user, and automatically generating a layout based on the scenario.

First, the flowchart of processing to be executed by the image sensing unit 203 will be explained with reference to FIG. 3.

In step S301, the image sensing unit 203 acquires an image data group. For example, the user connects, to the image processing apparatus 115, an image capturing apparatus or memory card which stores captured images, and loads the captured images from it, thereby acquiring an image data group. As the image data group, images which have been captured by the internal image capturing device 106 and stored in the secondary storage apparatus 103 may be acquired. The image data group may be acquired via the wireless LAN 109 from an apparatus other than the image processing apparatus 115, such as the external server 114 connected to the Internet 113.

Figure 8:
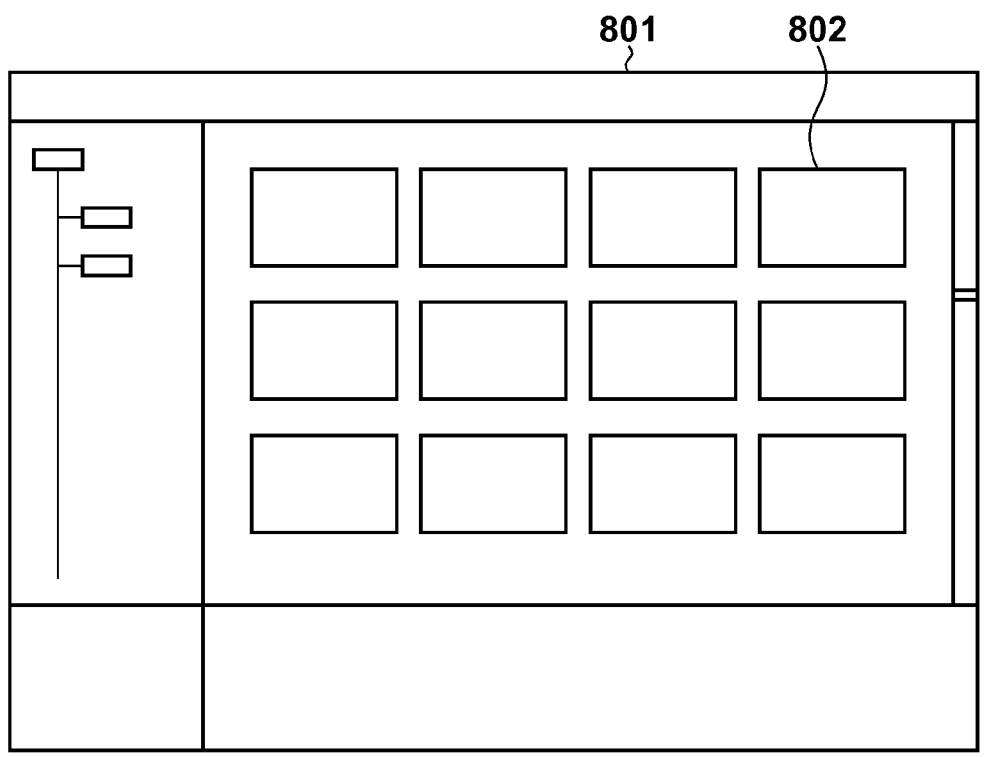
FIG. 8 is a view showing a display example of an image group in a thumbnail format.
Figure 9:
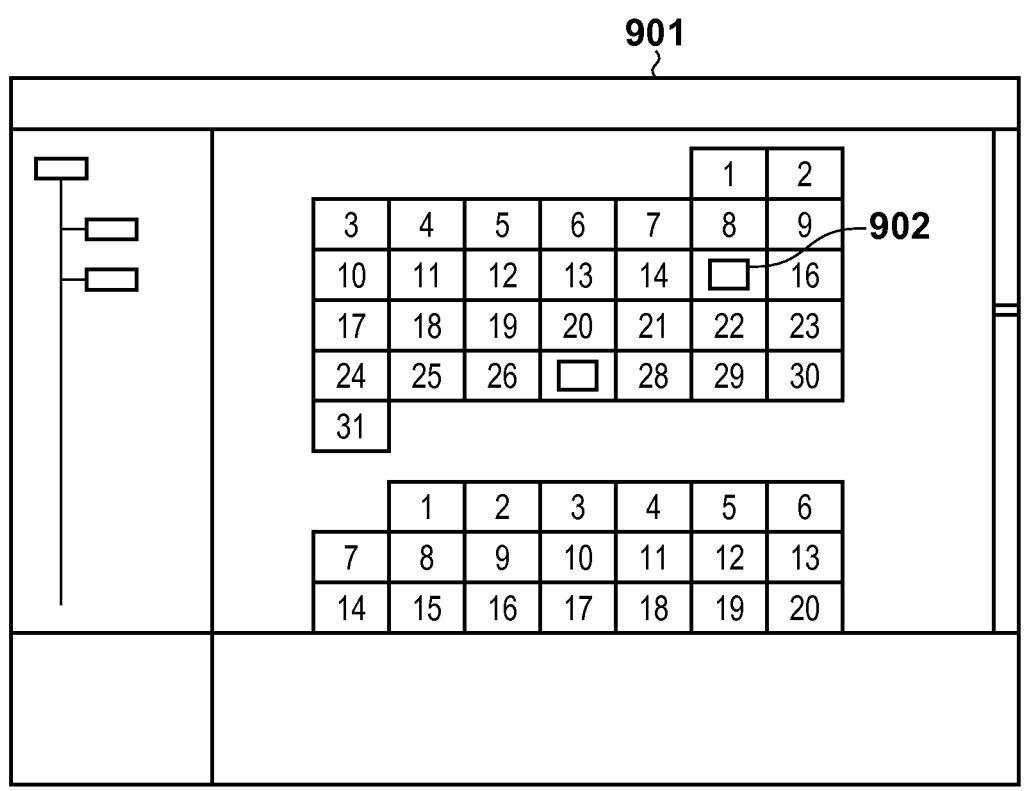
FIG. 9 is a view showing a display example of an image group in a calendar format.

A display on the display apparatus 104 upon acquiring an image data group will be explained with reference to FIGS. 8 and 9. When an image data group is acquired, the UI on the display apparatus 104 changes to a display which allows the user to confirm images based on the acquired image data, as shown in FIGS. 8 and 9. The UI display method on the display apparatus 104 is not particularly limited as long as an image can be confirmed. For example, thumbnails 802 of images may be displayed on a UI 801 for each folder in the secondary storage apparatus 103, as shown in FIG. 8. Alternatively, image data may be managed for each date of a calendar on a UI 901, as shown in FIG. 9. When the user clicks a date portion 902 on the UI 901 of FIG. 9, images captured at the clicked date are displayed in a thumbnail list as shown in FIG. 8.

In steps S302 to S305, analysis processing and database registration of the analysis result are performed for each acquired image data group.

More specifically, in step S302, the image sensing unit 203 decodes each image. The image sensing unit 203 (application) searches for image data which has newly been saved and has not undergone sensing processing yet. The image codec unit 200 converts (decodes) each extracted image from image data (compressed image data) into bitmap data.

In step S303, the image sensing unit 203 executes various sensing processes for the bitmap data to acquire sensing information, and registers the sensing information in a database. The sensing processing here indicates image analysis processing. In the embodiment, various image analysis processes shown in FIG. 10 are performed. More specifically, object face detection in image data, feature amount analysis of a face region, image feature amount analysis, and scene analysis are performed as the sensing processing, and results of data types as shown in FIG. 10 are calculated. In the embodiment, average luminance (int: value 0 to 255), average saturation (int: 0 to 255), and average hue (int: 0 to 359) are analyzed as basic image feature amounts. As face detection, the number of faces of persons (int: value 0 or more (0 to MAXFACE)) and coordinate positions (int*8: value 0 or more (same for Width and Height)) representing position information of a person's face are analyzed. Further, the average Y (int: value 0 to 255) in a face region, the average Cb (int: value −128 to 127) in the face region, and the average Cr (int: value −128 to 127) in the face region are analyzed.

Note that an object's face is a person's face in the embodiment, but the object may be the face of an animal such as a pet.

Each sensing processing will be explained below.

The average luminance and average saturation of an entire image, which are basic feature information of an image such as image feature amounts, can be calculated by a known method and will therefore be described briefly. For the average luminance, the R, G, and B components of each pixel of an image are converted into known luminance and color difference components (for example, Y, Cb, and Cr components), and the average value of the Y components is calculated. For the average saturation, the Cb and Cr components are calculated for each pixel, and the average value S is obtained by solving equation (1):

$$S = \sqrt{Cb^2 + Cr^2} \qquad (1)$$

The average hue AveH in an image is a feature amount to evaluate the tone of the image. The hue of each pixel can be obtained using a known HIS transformation. The values are averaged in the entire image, thereby obtaining AveH.

The feature amounts may be calculated for an entire image. Alternatively, for example, an image may be divided into regions having a predetermined size, and the feature amounts may be calculated for each region.

Face detection processing of people's faces will be described next. Various methods are usable as the person's face detection method according to the embodiment. In a method disclosed in Japanese Patent Laid-Open No. 2002-183731, first, an eye region is detected from an input image, and a region around the eye region is set as a face candidate region. The luminance gradient and the weight of the luminance gradient are calculated for the face candidate region. These values are compared with the gradient and gradient weight of a preset ideal reference face image. At this time, when the average angle between the gradients is equal to or smaller than a predetermined threshold, the input image is determined to have a face region.

In a method described in Japanese Patent Laid-Open No. 2003-30667, a flesh color region is detected from an image. A human iris color pixel is then detected in the flesh color region, thereby detecting the position of an eye.

In a method described in Japanese Patent Laid-Open No. 8-63597, the matching level between an image and each of a plurality of face shape templates is calculated. A template having a highest matching level is selected. If the highest matching level is equal to or more than a predetermined threshold, a region on the selected template is set as a face candidate region. By using this template, the position of an eye can be detected.

In a method described in Japanese Patent Laid-Open No. 2000-105829, a nose image pattern is set as a template, and an entire image or a designated region of an image is scanned. A position that matches the template most is output as the position of the nose. Then, a region above the nose position in the image is assumed to be a region where the eyes exist. The eye existence region is scanned using an eye image pattern as a template, and matching is calculated. A set of pixels whose matching levels are higher than a given threshold is acquired as an eye existence candidate position. A continuous region included in the eye existence candidate position set is divided into clusters. The distance between each cluster and the nose position is calculated. A cluster having a shortest distance is decided as a cluster including an eye, thereby detecting the organ position.

As other face detection processing methods, known methods of detecting a face and organ positions are usable, including methods described in Japanese Patent Laid-Open Nos. 8-77334, 2001-216515, 5-197793, 11-53525, 2000-132688, 2000-235648, and 11-250267, and Japanese Patent No. 2541688.

As a result of the face detection processing, the number of faces of people and the coordinate positions of each face can be acquired. Once face coordinate positions in an image are known, the average luminance and average color differences of the face region can be obtained by calculating, for each face region, the average Y, Cb, and Cr values of pixel values included in the face region.

Scene analysis processing can be performed using the feature amount of an image. The scene analysis processing can use various methods. For example, known methods as disclosed in Japanese Patent Laid-Open Nos. 2010-251999 and 2010-273144 filed by the present applicant are usable. As a result of the scene analysis processing, IDs for discriminating capturing scenes such as Landscape, Nightscape, Portrait, Underexposure, and Others can be acquired.

Note that the sensing information is not limited to that acquired by the above-described sensing processing, and any other sensing information may be used.

The image sensing unit 203 stores, in the database unit 202, the sensing information acquired in the above-described manner.

The save format in the database unit 202 is not particularly limited. The sensing information is described using, for example, a general-purpose format (for example, XML: eXtensible Markup Language) as shown in FIG. 11 and stored.

FIG. 11 shows an example in which pieces of attribute information of each image are classified into three categories and described. The first <BaseInfo> tag is information added to an acquired image file in advance and represents the image size and capturing time information. This tag includes the identifier ID (ID) of each image, the save location (<ImagePath>) where the image file is stored, the image size (<ImageSize . . . >), and the capturing date & time (<CaptureDateTime>).

The second <SensInfo> tag is used to store the result of the above-described image analysis processing. The average luminance, the average saturation, and the average hue of an entire image and the scene analysis result are stored. In addition, information associated with the face position and face color of a person present in the image can be described.

The third <UserInfo> tag can store information input by the user for each image, the details of which will be described later.

Note that the method of storing attribute information of an image in the database unit 202 is not limited to the above-described one, and any other known format is usable.

In step S305, the image sensing unit 203 determines whether unprocessed image data in the acquired image data group is the final image data. If the unprocessed image data is not the final image data (NO in step S305), the process returns to step S302, and the image sensing unit 203 acquires the unprocessed image data from the acquired image data group. If the unprocessed image data is the final image data (YES in step S305), the process advances to step S306.

In step S306, the image sensing unit 203 performs person grouping by using personal recognition processing. In this case, person group generation processing is generated to generate a group of each person by using the face position information detected in step S303. Automatically grouping person's faces in advance makes work efficient to name each person later by the user.

The person group generation processing is executed using a personal recognition technique according to the flowchart of FIG. 5.

Note that the personal recognition technique is mainly formed from two techniques, that is, extracting the feature amounts of organs such as an eye and mouth existing in a face and comparing the similarities of the relationships between them. As the personal recognition technique, a known method is usable, as disclosed in Japanese Patent No. 3469031.

FIG. 5 is a flowchart showing details of step S306.

In step S501, the image sensing unit 203 sequentially reads out and decodes image data stored in the secondary storage apparatus 103. The decoding processing is the same as step S302, and a description thereof will not be repeated.

In step S502, the image sensing unit 203 accesses the database unit 202 to acquire the number of faces included in the image data and face position information.

In step S504, the image sensing unit 203 generates a normalized face image to perform personal recognition processing.

The normalized face images are face images obtained by extracting faces existing in images with various sizes, orientations, and resolutions, and converting and cutting out them into faces having a predetermined size and orientation. Since the positions of organs, such as an eye and mouth, are important to perform personal recognition, the normalized face image has a sufficient size to reliably recognize the organs. By preparing the normalized face images, feature amount extraction processing need not cope with faces of various resolutions.

In step S505, the image sensing unit 203 extracts a face feature information such as face feature amounts from the normalized face image. The face feature amounts include the positions and sizes of organs such as an eye, mouth, and nose, and the outline of the face.

Figure 33:
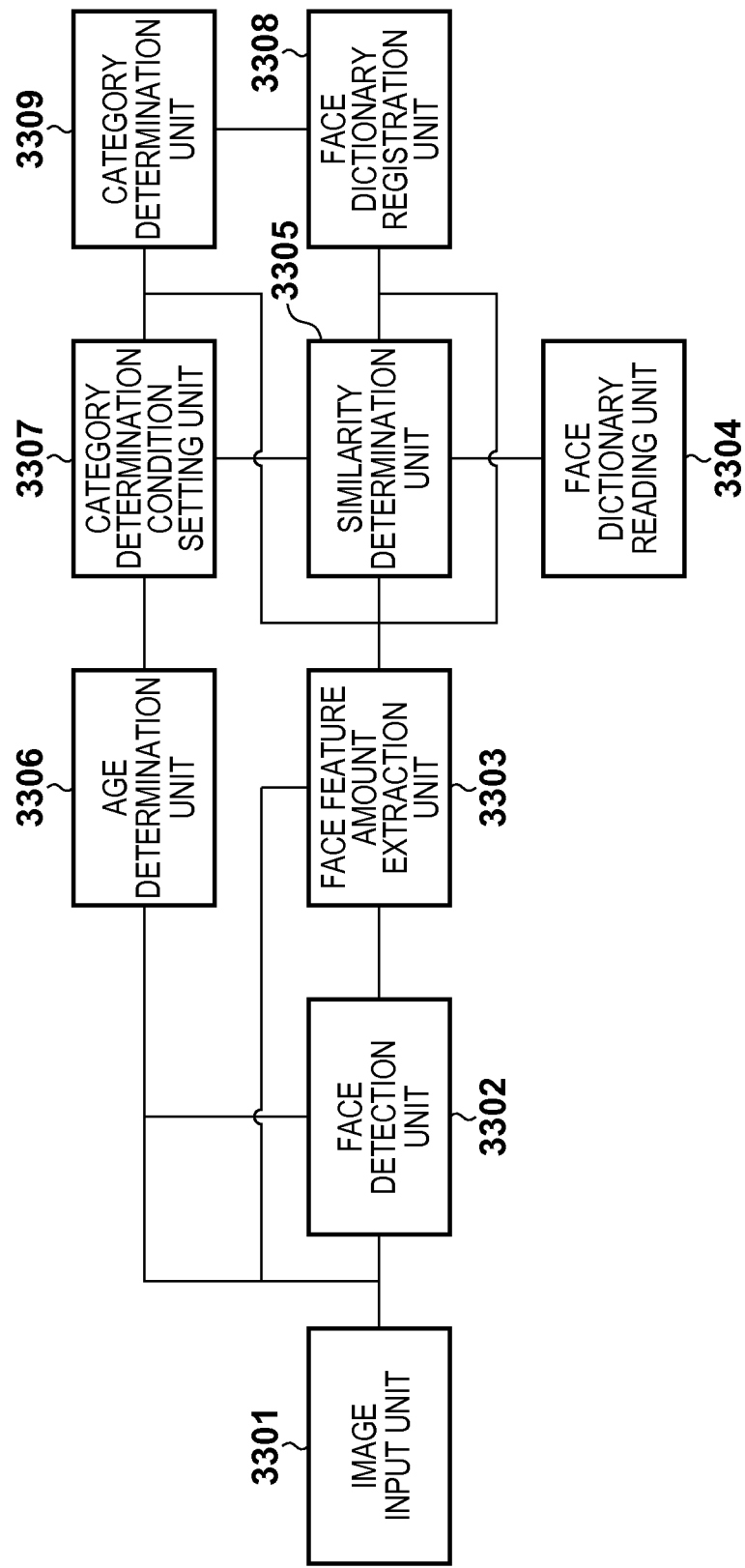
FIG. 33 is a block diagram for explaining a face dictionary creation apparatus.
Figure 35:
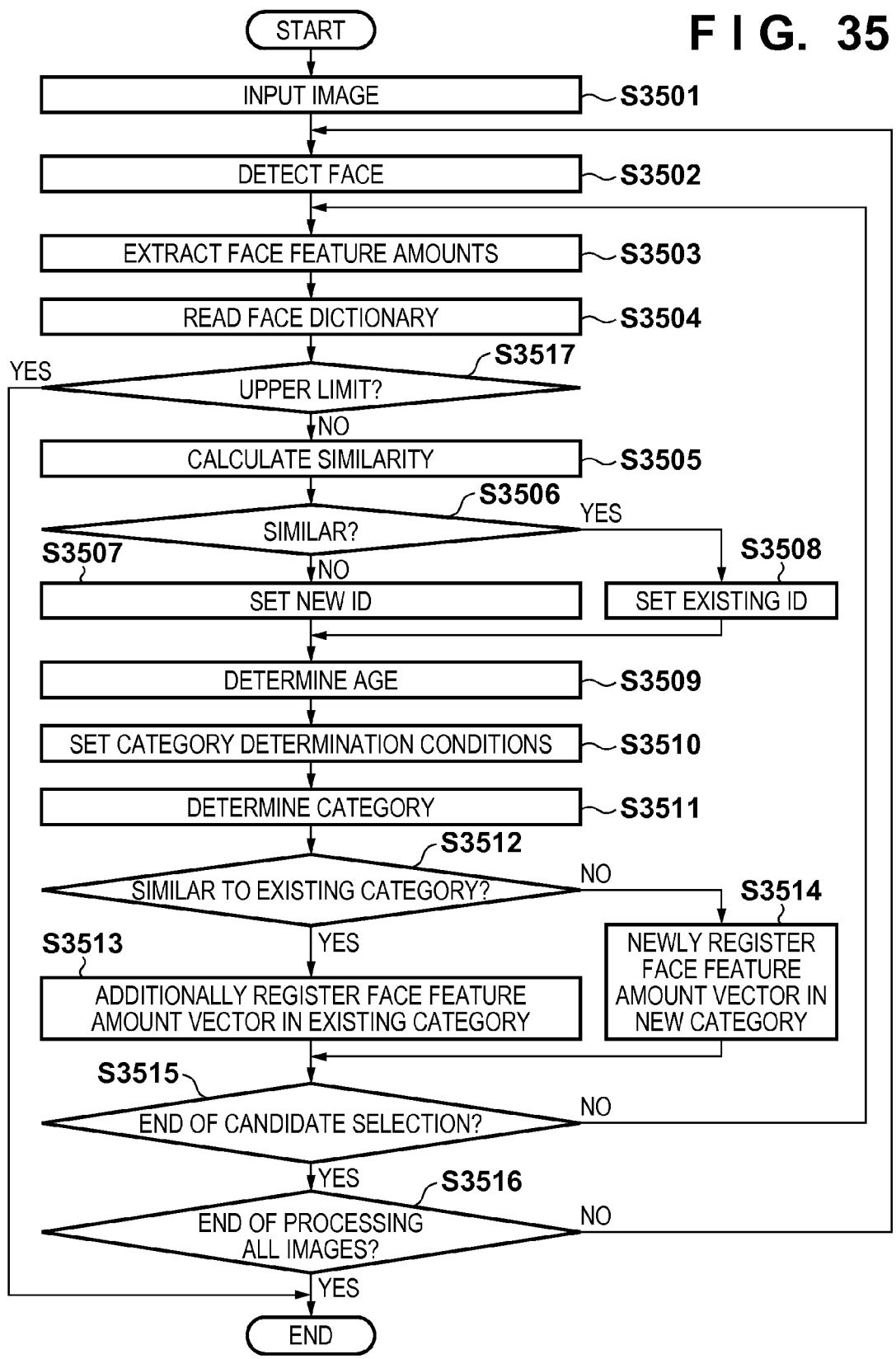
FIG. 35 is a flowchart showing face dictionary creation processing.

In step S506, the image sensing unit 203 refers to a face dictionary, which is built in the database unit 202 and stores face feature amounts prepared in advance for each person identifier (person ID), and determines whether face feature amounts stored in the face dictionary are similar to the extracted face feature amounts. Although all face feature amounts are registered in the above description, face feature amounts are not registered in some cases, as shown in FIGS. 33 and 35, the details of which will be described later.

If the image sensing unit 203 determines that the stored face feature amounts are similar to the extracted ones (YES in step S506), it additionally registers the extracted feature amounts as additional feature amounts of the same (or similar) person in the entry of the corresponding person ID in step S509.

If the image sensing unit 203 determines that the stored face feature amounts are not similar to the extracted ones (NO in step S506), the feature amounts of the currently evaluated face are considered to be of a person different from those registered in the face dictionary until now in step S508. Thus, the image sensing unit 203 issues a new person ID, and newly registers the feature amounts in the face dictionary. In the embodiment, the feature amounts of a face determined to be in a poor face state in face state determination are not registered in the dictionary.

In step S510, the image sensing unit 203 determines whether there is another face region in the processing target image data. If there is another face region (YES in step S510), the process returns to step S502. If there is no other face region (NO in step S510), the process advances to step S511.

In step S511, the image sensing unit 203 determines whether the processes in steps S502 to S509 have ended for all images. If the processes have ended for all images, the process ends. If the processes have not ended for all images, the process returns to step S502. That is, the image sensing unit 203 applies the processes in steps S502 to S509 to all face regions detected from the acquired image data group, and groups appearing persons.

Figures 15, 16:
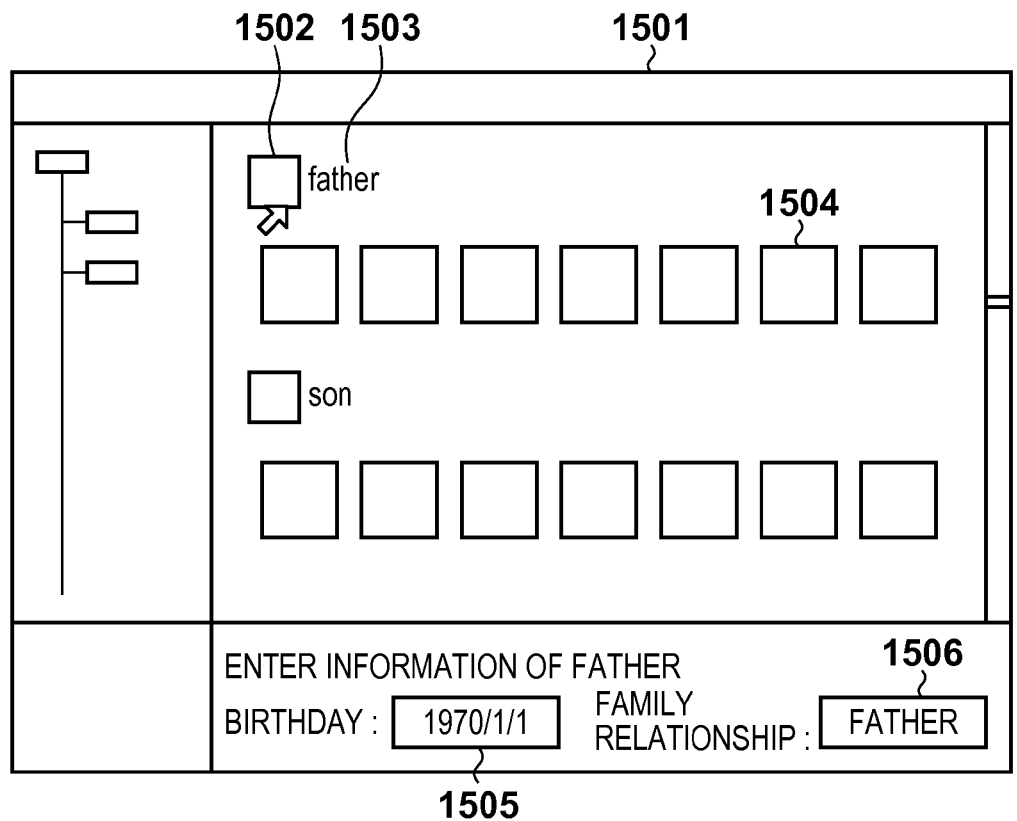
FIG. 15 is a view showing an example of a UI used to manually input person attribute information.
FIG. 16 is a view showing an example of a person attribute information save format.

The grouping result is described using an ID tag for each face region, as represented by the XML format of FIG. 16, and saved in the database unit 202 (FIG. 3).

In the first embodiment, person group generation processing is executed after the end of sensing processing and database registration of all image data, as shown in FIG. 3. However, another method may be adopted. For example, as shown in FIG. 4, after each image data undergoes sensing processing and is registered in the database in step S403, person group generation processing is executed in step S405 using face position information. All image data are processed by repeating these processes.

Figure 7:
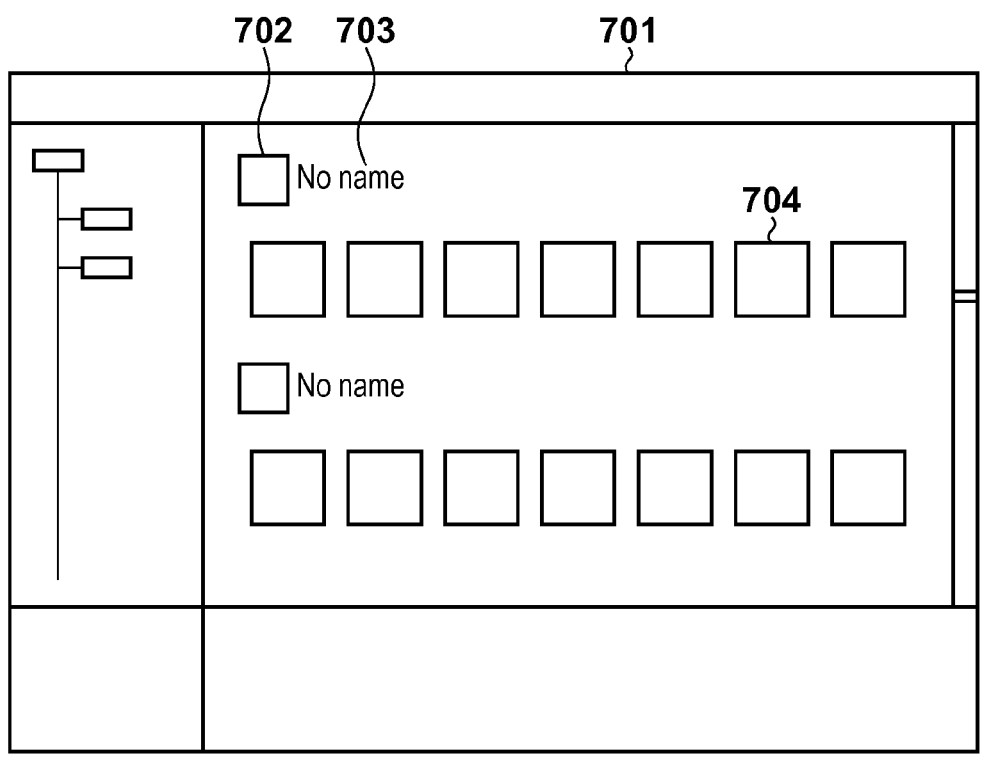
FIG. 7 is a view showing a display example of person groups.

Each person group obtained by the above-described processing is displayed on the UI of the display apparatus 104. FIG. 7 shows display of each person group according to the embodiment. On a UI 701 of FIG. 7, reference numeral 702 denotes a representative face image of the person group. Beside the representative face image 702, a region 703 exists and displays the name of the person group. Immediately after the end of automatic person grouping processing, a person name "No name" is displayed in the region 703, as shown in FIG. 7. In 704, a plurality of face images included in the person group are displayed. In the UI 701 of FIG. 7, a person name can be input by designating the "No name" region 703, or information such as the birthday or family relationship can be input for each person, as will be described later.

The above-described sensing processing may be executed using the background task of the operating system. In this case, even if the user is performing another work in the computer 115, he can continue sensing processing for an image group.

In the embodiment, various kinds of attribute information about an image may be set manually by the user or automatically.

FIG. 12 shows a list of examples of the attribute information. The manually or automatically registered attribute information is roughly divided into image attribute information set for each image and person attribute information set for each person grouped by person grouping processing.

Figure 13:
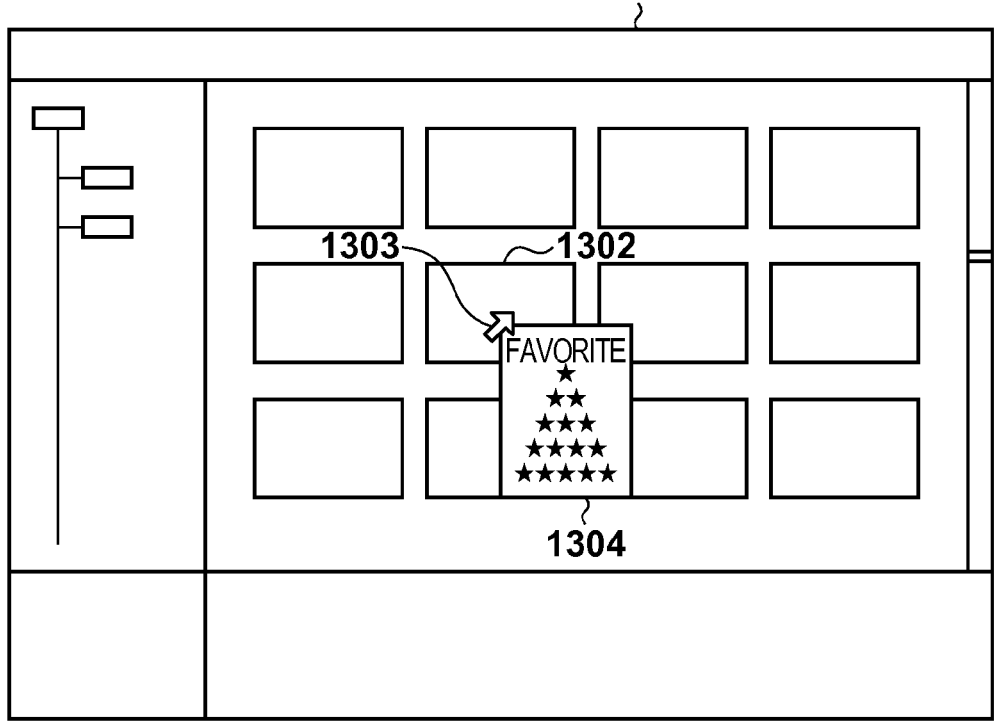
FIG. 13 is a view showing an example of a UI used to manually input the favorite rate.

An example of the image attribute information is the favorite rate of the user. The user can manually input the favorite rate representing whether he likes the image. For example, as shown in FIG. 13, the user selects a thumbnail image 1302 he wants on a UI 1301 by using a mouse pointer 1303 and right-clicks to display a dialog capable of inputting the favorite rate. The user can select the number of "★"s in the menu in accordance with his preference. In the embodiment, it is set to increase the number of "★"s as the favorite rate is higher.

The favorite rate may be set not manually by the user but automatically. For example, the number of times of viewing by the user may automatically be set as the favorite rate. Assume that the user clicks on a thumbnail (image file) he wants, and the state of the thumbnail image list display (UI 801) shown in FIG. 8 changes to a single image display screen. The transition count may be measured to automatically set the favorite rate in accordance with the count. That is, it is determined that the user likes the image much more as the number of times of viewing increases.

As another example, the favorite rate may be automatically set in accordance with the number of times of printing. For example, when the user performs a print operation, it is determined that he likes the image, and the favorite rate is determined to be higher as the number of times of printing increases.

As described above, the favorite rate is manually set by the user or automatically set based on the number of times of viewing or the number of times of printing.

The above-described attribute information is individually stored in the <UserInfo> tag of the database unit 202 using the XML format as shown in FIG. 11. For example, the favorite rate is stored in a <FavoriteRate> tag, the number of times of viewing is stored in a <ViewingTimes> tag, and the number of times of printing is stored in a <PrintingTimes> tag.

Another attribute information set for each image is event information. Examples of the event information are the family travel "travel", graduation ceremony "graduation", and wedding "wedding".

Figure 14:
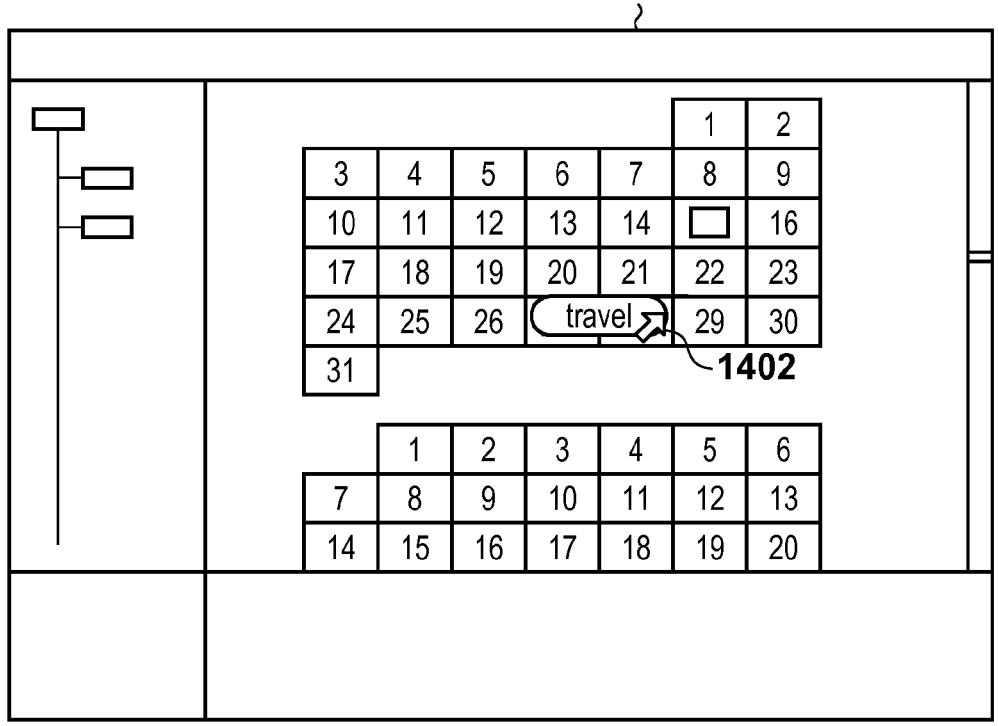
FIG. 14 is a view showing an example of a UI used to manually input event information.

To designate the event, for example, the user may designate a date he wants on a calendar represented on a UI 1401 of FIG. 14 using a mouse pointer 1402, and input the name of the event on that day. The designated event name (event information) is included in the XML format shown in FIG. 11 as part of the image attribute information. In the XML format, the event name and image are associated (linked) with each other using an <Event> tag in the <UserInfo> tag.

Next, person attribute information will be described with reference to FIG. 15.

FIG. 15 shows a UI 1501 for inputting person attribute information. In FIG. 15, reference numeral 1502 denotes a representative face image of a predetermined person (in this case, "father"). Reference numeral 1503 denotes a region where the name of the predetermined person is displayed. In 1504, a list of images which are detected from other images and are determined in step S506 to have similar face feature amounts is displayed.

Immediately after the end of sensing processing, no name is input for each person group, as shown in FIG. 7. However, an arbitrary person name can be input by designating the "No name" portion 703 with the mouse pointer. When the arbitrary person name is input, the name of the predetermined person is displayed in the region 1503, as shown in FIG. 15.

As attribute information of each person, the birthday of the person or the family relationship viewed from the user who operates the application can also be set. In the embodiment, when the user clicks on the representative face image 1502 of the person in FIG. 15, he can input the birthday of the clicked person by using a first input portion 1505, and family relationship information by using a second input portion 1506, as illustrated on the lower portion of FIG. 15.

Unlike the above-described image attribute information linked with the images, the input person attribute information is managed in the database unit 202 separately from the image attribute information by using the XML format as shown in FIG. 16.

Figure 17:
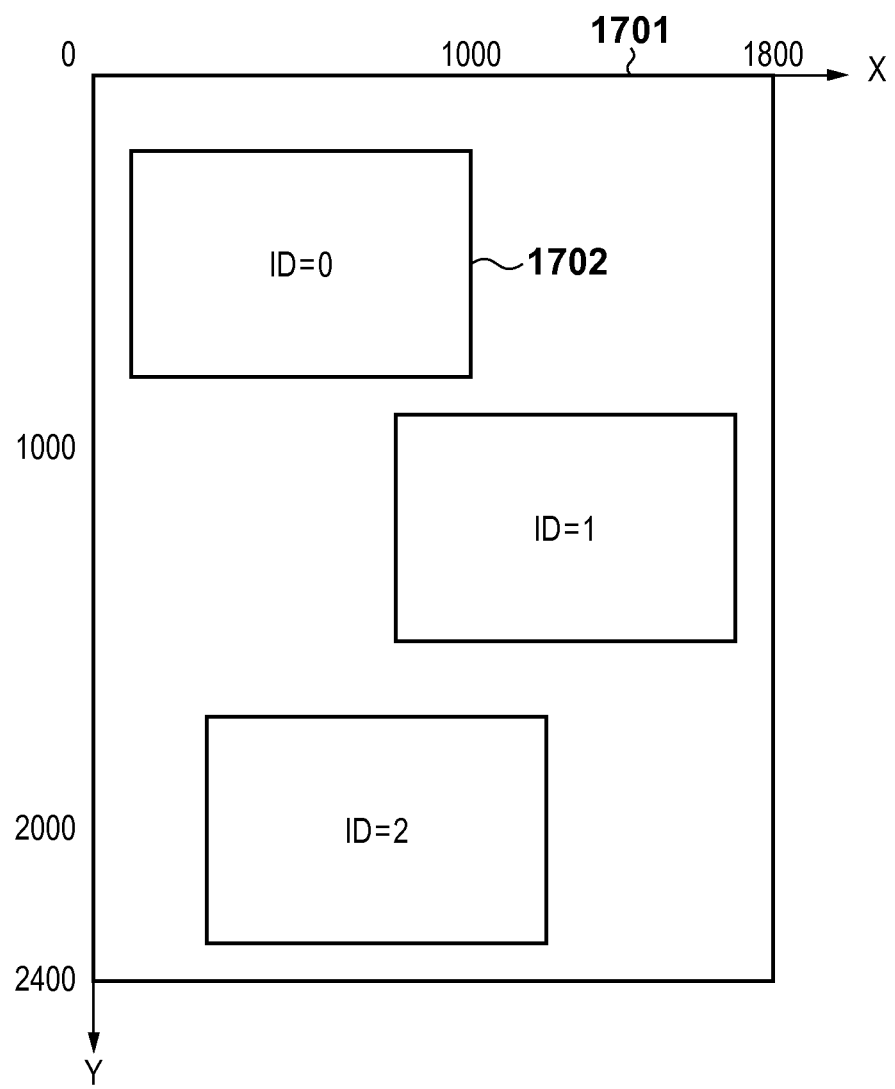
FIG. 17 is a view showing an example of a layout template.
Figure 19:
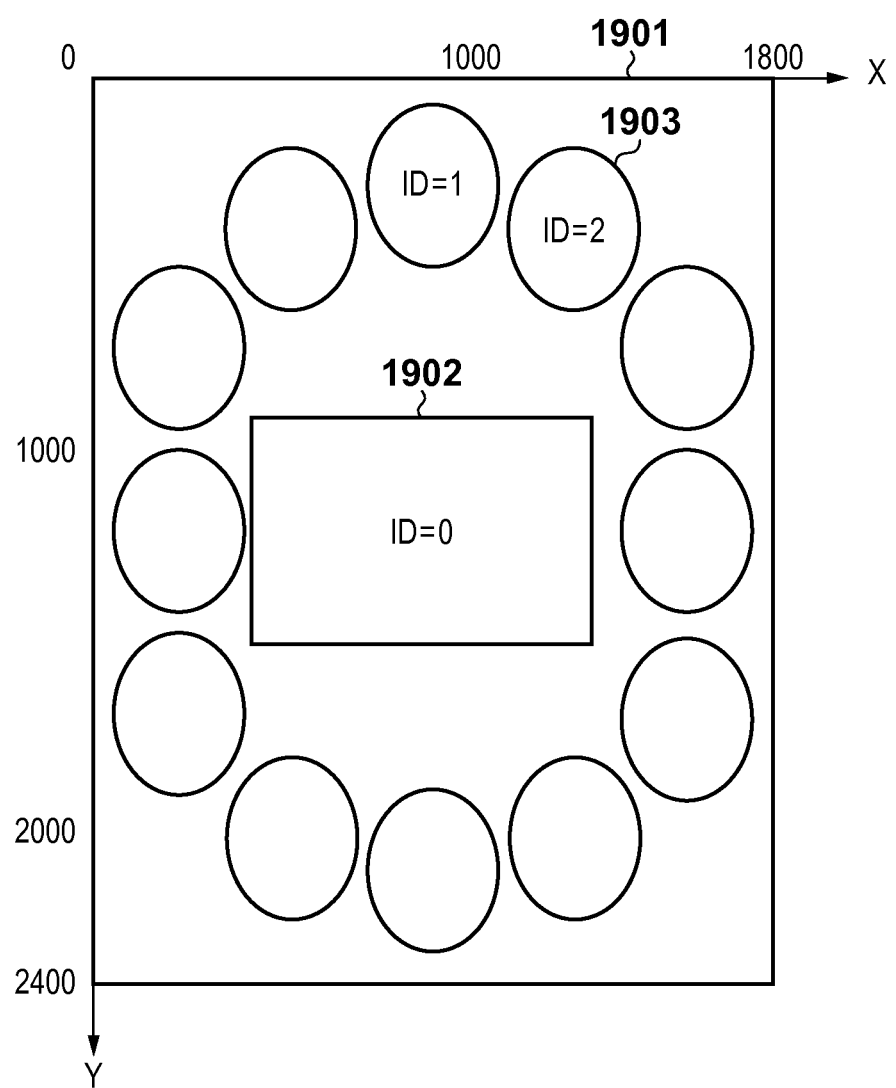
FIG. 19 is a view showing an example of a layout template.

In the first embodiment, various layout templates are prepared in advance. Examples of the layout templates are shown in FIGS. 17 and 19. Each layout template includes a plurality of image arrangement frames 1702, or 1902 and 1903 (to be synonymous with slots hereinafter) on a sheet 1701 or 1901 to lay out images.

Such layout templates are saved in the secondary storage apparatus 103 in advance when the software to execute the first embodiment is installed in the image processing apparatus 115. As another method, an arbitrary layout template may be acquired from the external server 114 present on the Internet 113 connected via the IF 107 or wireless LAN 109.

These layout templates are assumed to be described in a highly versatile structured language, for example, the XML format, similar to storage of a sensing processing result described above. FIGS. 18 and 20 show examples of XML data for the layout templates in FIGS. 17 and 19. In FIGS. 18 and 20, first, a <BASIC> tag describes basic information of a layout template. The basic information includes, for example, the theme of the layout template, the page size, and the page resolution (dpi). In FIGS. 18 and 20, a <Theme> tag representing the theme of the layout template is blank in the initial state of the layout template. As the basic information, the page size (<PageSize> tag) is set to A4, and the resolution (<Resolution> tag) is set to 300 dpi.

Subsequently, information of the above-described image arrangement frame is described by an <ImageSlot> tag. The <ImageSlot> tag holds two tags, that is, an <ID> tag and a <POSITION> tag to describe the ID and position of the image arrangement frame. The position information is defined in, for example, an X-Y coordinate system having its origin at the upper left corner, as shown in FIGS. 17 and 19.

The <ImageSlot> tag can also set, for each slot, the shape of the slot and the name of a recommended person group to be arranged.

For example, for the layout template of FIG. 17, the <Shape> tag of FIG. 18 describes a rectangular shape ("rectangle") for all slots, and the <PersonGroup> tag recommends to arrange "MainGroup" as the person group name.

For the layout template of FIG. 19, it is described that a slot with ID=0 arranged at the center has a rectangular shape ("rectangle"), as shown in FIG. 20. Also, it is recommended that "SubGroup" is arranged as the person group, and subsequent slots with ID=1 and 2 have an elliptical shape ("ellipse"), and "MainGroup" is arranged as the person group.

In the first embodiment, many layout templates of this type are held

As described above, the application according to the embodiment can execute analysis processing for an input image group, automatically group persons, and display them on a UI. Viewing the result, the user can input attribute information such as a name and birthday for each person group and set the favorite rate or the like for each image.

Further, a number of layout templates classified by the theme can be held.

When the above-described conditions are satisfied, the application according to the embodiment performs, at a predetermined timing, processing of automatically generating a collage layout the user is likely to be fond of, and presenting it to the user (to be referred to as layout proposal processing hereinafter).

FIG. 6 shows the basic flowchart of the layout proposal processing.

First, in step S601, the scenario generation unit 204 decides the scenario of proposal processing. The scenario includes the theme of a layout to be proposed, a layout template, setting of a person (main character) to be emphasized in the layout, and selection information of an image group to be used for layout generation.

Two scenario decisions will be described below.

For example, assume that it is set to automatically generate and present a collage layout two weeks before the birthday of each person. Also, assume that the first birthday of the person "son" automatically grouped in FIG. 15 will come two weeks later. In this case, the theme of the layout to be proposed is decided as the growth record "growth". Then, a template is selected. In this case, a layout template as shown in FIG. 19 suitable for the growth record is selected, and "growth" is described in the <Theme> tag of XML, as shown in FIG. 30. Next, "son" is set as the main character "MainGroup" on which focus is placed at the time of layout. Then, "son" and "father" are set as "SubGroup" on which focus is secondarily placed at the time of layout. An image group to be used for layout is selected. In this example, the database unit 202 is referred to, and images including "son" are extracted and listed out of the images captured so far from the birthday of the person "son". The image list generated by the listing is stored and managed in the database unit 202. The scenario decision for the growth record layout has been described.

As a different example, assume that it is set in advance to automatically generate and present a collage layout when there are travel photos captured within one month. If it is known based on the event information registered in FIG. 14 that the family traveled several days ago and images of the travel are saved in the secondary storage apparatus 103, the scenario generation unit 204 decides a scenario to propose a layout of the family travel. In this case, the theme of the layout to be proposed is decided as the travel "travel". A layout template is selected. In this case, a layout template as shown in FIG. 17 is selected, and "travel" is described in the <Theme> tag portion of XML, as shown in FIG. 31. Then, "son", "mother", and "father" are set as the main character "MainGroup" on which focus is placed at the time of layout. In this way, a plurality of persons can be set as "MainGroup" by taking advantage of the characteristics of XML. Next, an image group to be used for layout is selected. In this example, the database unit 202 is referred to, and images linked with the travel event "travel" are extracted and listed. The image list generated by the listing is stored and managed in, for example, the database unit 202. The scenario decision for the layout of the family travel has been described.

Figure 21:
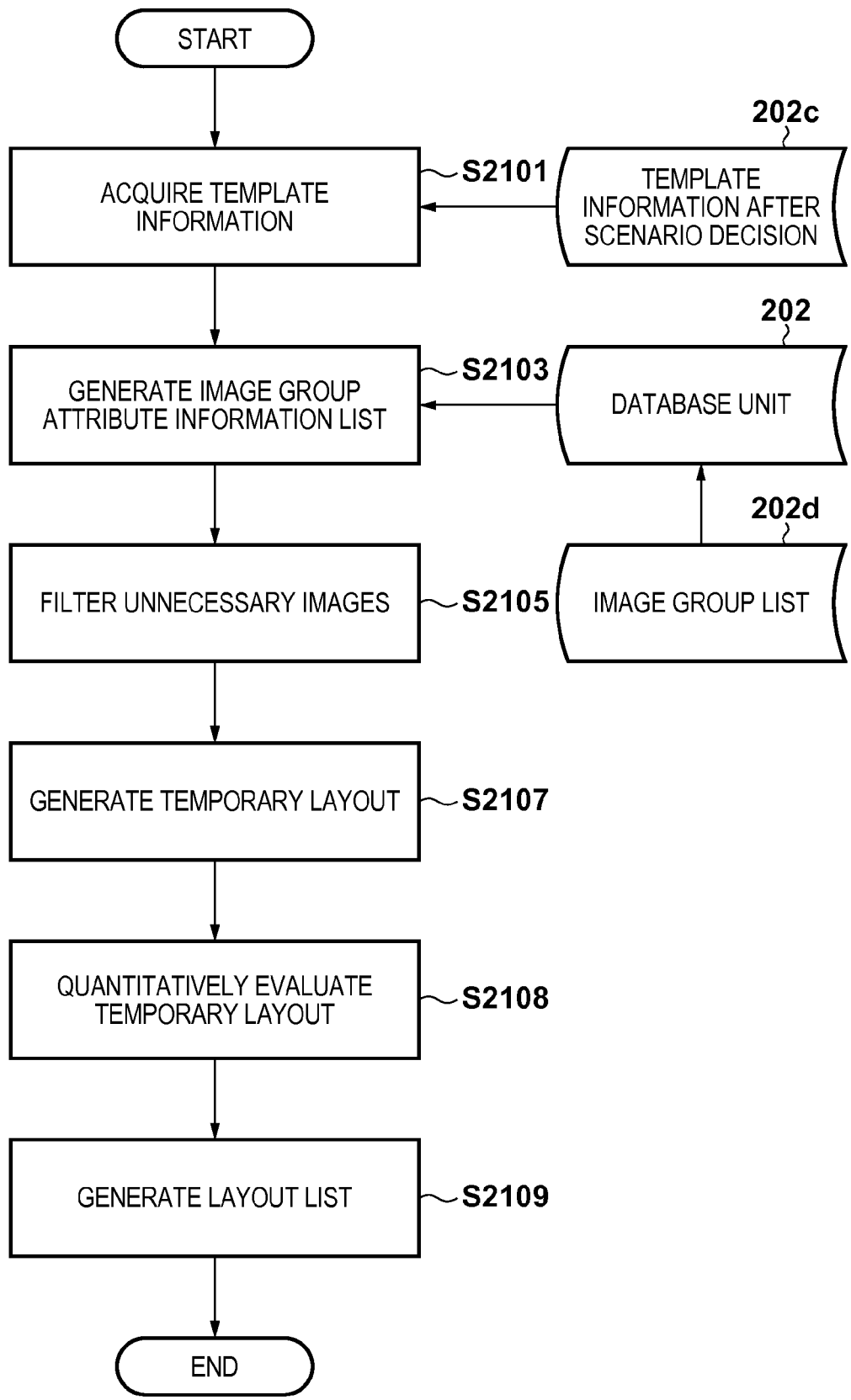
FIG. 21 is a flowchart of automatic layout generation processing according to the first embodiment.

In step S603 of FIG. 6, the layout generation unit 205 executes automatic layout generation processing based on the above-described scenario. The automatic layout generation processing based on the scenario will be described here with reference to FIG. 21. FIG. 21 shows the detailed processing sequence of the layout processing unit.

First, in step S2101, the layout generation unit 205 acquires, from the database unit 202, layout template information 202c after the layout theme and the person group information decided by the scenario are set.

Then, in step S2103, the layout generation unit 205 acquires the feature amounts of each image from the database unit 202 based on an image group list 202d decided by the scenario, and generates an image group attribute information list. The image group attribute information list has a structure in which the <IMAGEINFO> tags shown in FIG. 11 are arranged as many as the number of image lists. The layout generation unit 205 performs the automatic layout generation processing in steps S2105 to S2109 based on the image group attribute information list.

As described above, in the automatic layout generation processing of the embodiment, attribute information stored in the database unit 202 by performing sensing processing in advance for each image is used, instead of directly handling the image data itself. This is because if the image data itself is used when performing the layout generation processing, a very large memory area is required to store the image group. The utilization of the memory area can be reduced by using the attribute information stored in the database unit 202, as in the embodiment.

In step S2105, the layout generation unit 205 filters unnecessary images from the input image group by using the attribute information of the input image group. The filtering processing will be explained with reference to FIG. 22.

Figure 22:
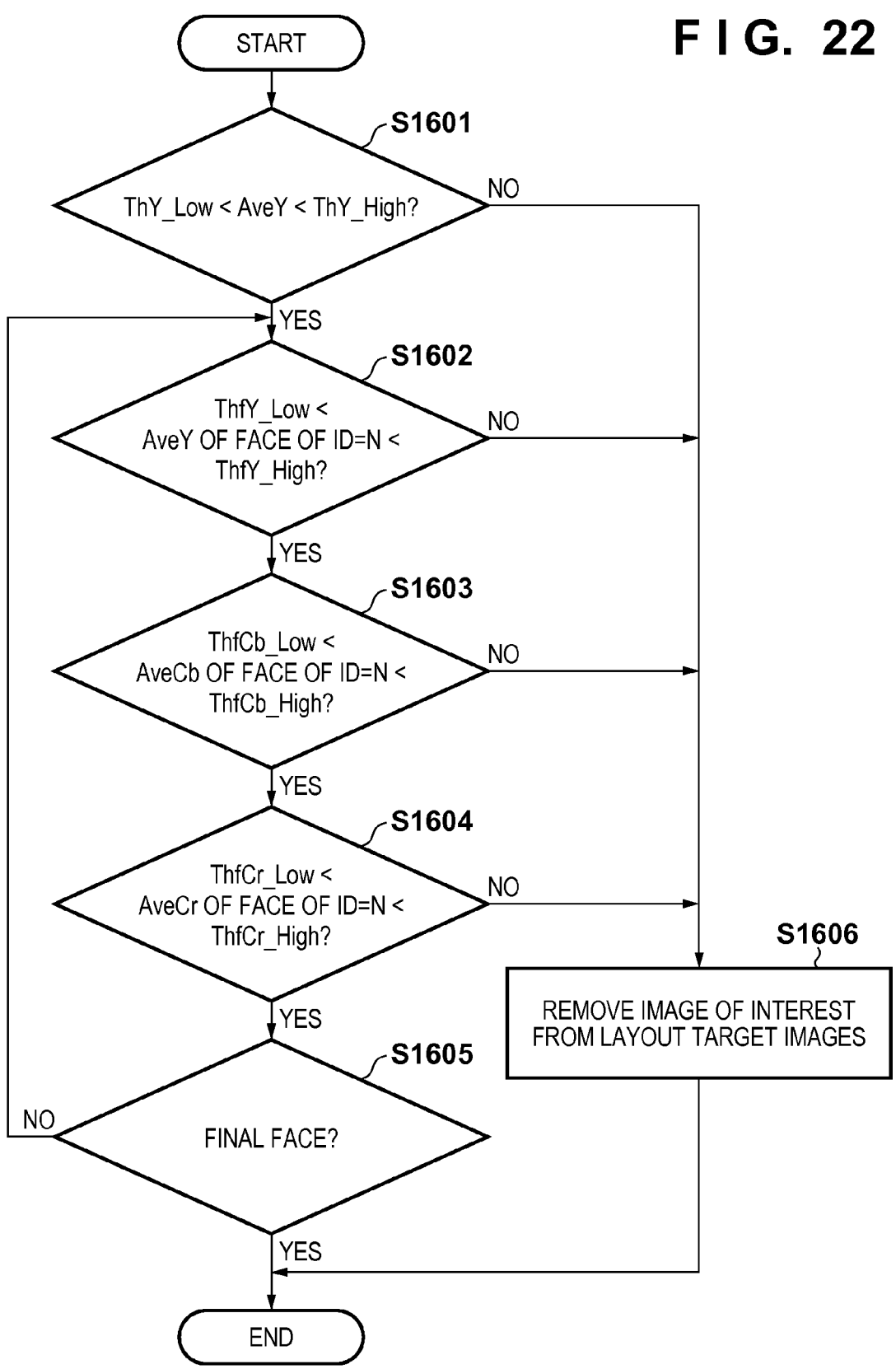
FIG. 22 is a flowchart of unnecessary image filtering processing according to the first embodiment.

FIG. 22 is a flowchart of the filtering processing.

In step S1601, the layout generation unit 205 determines for each image whether the average luminance value AveY of the entire image falls within the range of predetermined thresholds ThY_Low and ThY_High. If the average luminance value AveY falls outside the range (NO in step S1601), the process advances to step S1606, and the layout generation unit 205 removes the image of interest from the layout target image.

Similarly, in steps S1602 to S1605, the layout generation unit 205 determines, for each face region included in the image of interest, whether the average luminance and color difference components (for example, AveY, AveCb, and AveCr components) fall within the ranges of predetermined thresholds representing a satisfactory flesh color region. More specifically, in step S1602, the layout generation unit 205 determines whether AveY of a face region with ID=N falls within the range of predetermined thresholds ThfY_Low and ThfY_High. In step S1603, the layout generation unit 205 determines whether AveCb of the face region with ID=N falls within the range of predetermined thresholds ThfCb_Low and ThfCb_High. In step S1604, the layout generation unit 205 determines whether AveCr of the face region with ID=N falls within the range of predetermined thresholds ThfCr_Low and ThfCr_High. In step S1605, the layout generation unit 205 determines whether the face is the final face. If the face is not the final face, the process returns to step S1602. If the face is the final face, the process ends.

Only an image for which all determinations of steps S1602 to S1605 end with "YES" is applied to subsequent layout generation processing.

Since this filtering processing aims at removing images that can obviously be determined to be unnecessary for the subsequent temporary layout creation processing, the thresholds are desirably set relatively leniently. For example, in the overall image luminance determination of step S1601, if the difference between ThY_High and ThY_Low is much smaller than the image dynamic range, the number of images determined as "YES" accordingly decreases. Hence, in the filtering processing of the embodiment, the difference between the thresholds is set as large as possible. In addition, thresholds which can remove an image that is obviously determined as an abnormal image are set.

Next, in step S2107 of FIG. 21, the layout generation unit 205 generates an enormous number of (L) temporary layouts by using the image group determined as the layout target by the above-described processing of FIG. 22. Temporary layout generation is executed by repeating processing of arbitrarily applying an input image to an image arrangement frame of the acquired template. At this time, the following parameters (image selection, arrangement, and trimming criterion) are decided at random.

The image selection defines, for example, an image which should be selected from the image group when N image arrangement frames exist in the layout. The arrangement defines, for example, arrangement frames in which a plurality of selected images should be arranged. The trimming criterion defines a trimming ratio representing the degree of trimming processing to be performed for an arranged image.

The trimming ratio is represented by, for example, 0% to 100%. An image is trimmed using the center of the image as the reference, as shown in FIG. 23. In FIG. 23, reference numeral 2301 denotes an entire image; and 2302, a cutting frame for trimming at a trimming ratio of 50%.

Based on the above-described image selection, arrangement, and trimming criterion, as many as possible temporary layouts are generated. The generated temporary layouts can be expressed by XML, as shown in FIG. 32. The ID of the image selected and arranged in each slot is described by the <ImageID> tag, and the trimming ratio is described by the <TrimingRatio> tag.

Note that the number L of temporary layouts generated here is decided in accordance with the throughput of evaluation processing in a layout evaluation step to be described later and the performance of the image processing apparatus 115 that performs the processing. For example, several hundred thousand or more different temporary layouts are prepared. Each generated layout can be saved together with an ID in the secondary storage apparatus 103 as a file using the XML format shown in FIG. 32, or stored in the RAM 102 using another data structure such as a structure.

Next, in step S2108 of FIG. 21, the layout generation unit 205 evaluates the L created temporary layouts by using predetermined layout evaluation amounts. FIG. 24 shows a list of layout evaluation amounts according to the embodiment. As shown in FIG. 24, the layout evaluation amounts used in the embodiment can be mainly divided into three categories.

Figure 25:
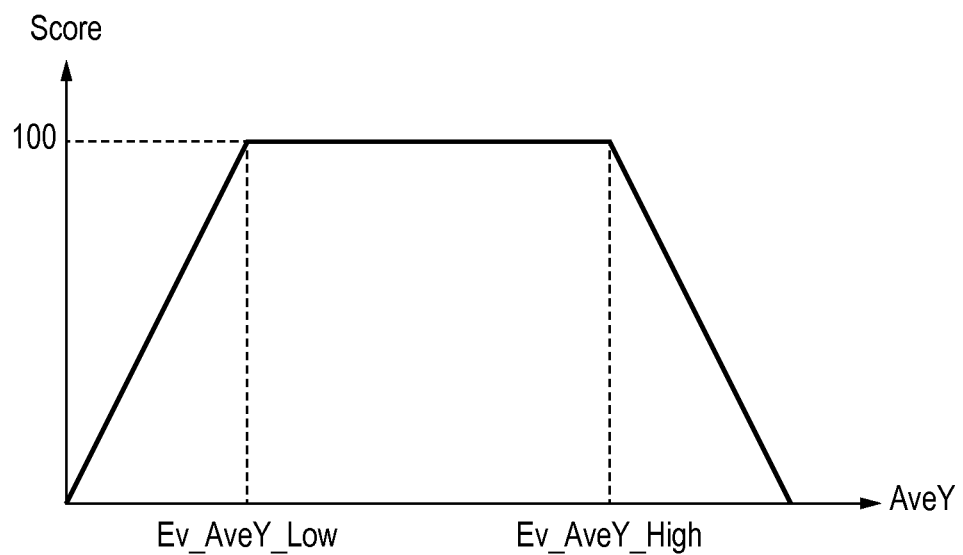
FIG. 25 is a graph for explaining a method of calculating brightness appropriateness.
Figure 26:
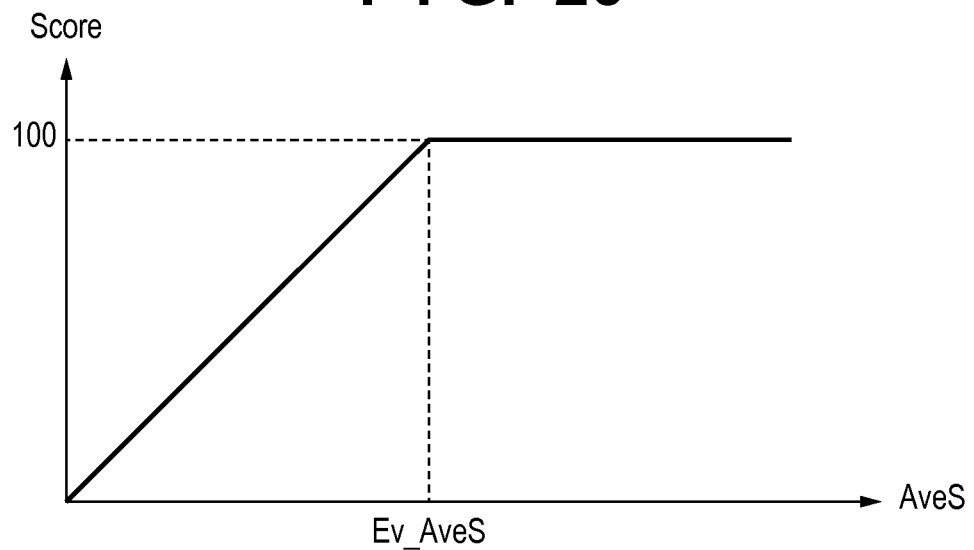
FIG. 26 is a graph for explaining a method of calculating saturation appropriateness.

The first evaluation category includes the evaluation amounts of each image. The evaluation amounts are used to determine states such as the brightness, saturation, and blur amount of an image and score the states. An example of scoring will be described below. The brightness appropriateness scores 100 when the average luminance falls within a predetermined threshold range, as shown in FIG. 25. The score is set to be lower when the average luminance falls outside the predetermined threshold range. The saturation appropriateness scores 100 when the average saturation of the entire image is larger than a predetermined saturation value, as shown in FIG. 26. The score is set to gradually decrease when the average saturation is smaller than the predetermined value.

The second evaluation category targets the evaluation of matching between an image and a slot (image/slot matching evaluation). The image/slot matching is determined and scored. Examples of evaluation of the image/slot matching are person matching and trimming loss determination. The person matching represents the matching ratio of a person designated for a slot to a person who exists in an image actually arranged in the slot. For example, assume that "father" and "son" are designated for a slot as "PersonGroup" designated by XML. At this time, when the two persons are included in the image assigned to the slot, the person matching of the slot scores 100. If only one of the persons is included, the matching scores 50. If neither person is included, the matching scores 0. The matching in a slot is the average value of matchings calculated for respective slots.

Figures 27, 28:
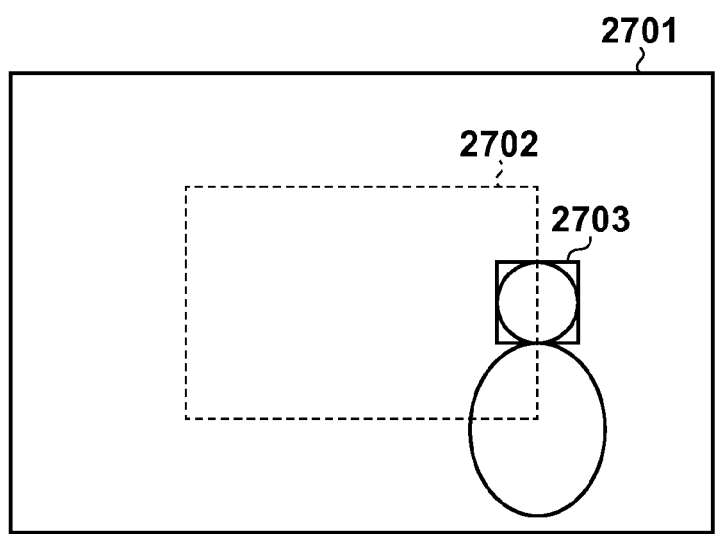
FIG. 27 is a view for explaining trimming loss determination processing.
FIG. 28 is a table for explaining image similarity determination processing.

Another image/slot matching evaluation value represents a loss determination of a trimming region 2702. For example, when a position 2703 of a face existing in an image 2701 is known, as shown in FIG. 27, scores of 0 to 100 are calculated in accordance with the area of the lost portion. If the area of the lost portion is 0, the score is 100. Conversely, if the whole face region is lost, the score is 0.

The third evaluation category evaluates the balance in a layout page (in-page balance evaluation). FIG. 24 shows image similarity, tone variation, and face size variation as the evaluation values used to evaluate the balance.

The "image similarity" will be described first. As the image similarity, the similarity between images is calculated for each of the enormous number of generated temporary layouts. For example, if only similar images that resemble each other are arranged at the time of creating a layout of the travel theme, the layout may be not good. For example, the similarity can be evaluated by the capturing the date & time. If the capturing dates & times of images are close, the images are highly likely to have been captured at similar places. However, if the capturing dates & times are far off, there is a high probability that both the places and the scenes are different. The capturing date & time can be acquired from attribute information of each image, which is saved in the database unit 202 in advance as image attribute information, as shown in FIG. 11.

To calculate a similarity from the capturing dates & times, the following calculation is performed. For example, assume that four images as shown in FIG. 28 are laid out in the temporary layout of interest. In FIG. 28, capturing date & time information is added to each image specified by an image ID. More specifically, year/month/day and time (AD: YYYY, month: MM, day: DD, hour: HH, minute: MM, second: SS) are added as a capturing date & time. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is calculated. A similarity evaluation value Similarity[l] of the lth temporary layout can be calculated by Similarity[$l$]=100×stMinInterval[$l$]/MaxMinInterval That is, Similarity[l] is effective as the image similarity evaluation value because it comes close to 100 as the minimum capturing time interval becomes large, and close to 0 as the time interval becomes small.

The "tone variation" will be explained next as an evaluation value used to evaluate the balance in a layout page. For example, if only images of similar colors (for example, blue of a blue sky, green of a mountain) are arranged at the time of creating a layout of the travel theme, the layout may be not good. In this case, the tone variation is set large. In this case, the variance of the average hues AveH of images present in the lth temporary layout of interest is calculated and stored as a tone variation tmpColorVariance[l]. A maximum value MaxColorVariance in tmpColorVariance[l] is calculated. A tone variation evaluation value ColorVariance[l] of the lth temporary layout can be calculated by ColorVariance[$l$]=100×tmpColorVariance[$l$]/MaxColorVariance That is, ColorVariance[l] is effective as the tone variation evaluation value because it comes close to 100 as the variation of the average hues of images arranged in a page becomes large, and close to 0 as the variation of the average hues becomes small.

The "face size variation" will be explained next as an evaluation value used to evaluate the balance in a layout page. For example, if only images of similar face sizes are arranged in a layout result at the time of creating a layout of the travel theme, the layout may be not good. Assume that a good layout is obtained when images of a variety of face sizes, including small and large face sizes on the sheet surface after layout, are arranged with good balance. In this case, the face size variation is set large. Hence, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is calculated. A face size variation evaluation value FaceVariance[l] of the lth temporary layout can be calculated by FaceVariance[$l$]=100×tmpFaceVariance[$l$]/MaxFaceVariance That is, FaceVariance[l] is effective as the face size variation evaluation value because it comes close to 100 as the variation of face sizes arranged on the sheet surface becomes large, and close to 0 as the variation of the face sizes becomes small.

As another category, user taste evaluation is usable.

The plurality of evaluation values described above, which are calculated for each temporary layout, are integrated and referred to as a layout evaluation value for each temporary layout. Let EvalLayout[l] be the integrated evaluation value of the lth temporary layout, and EvalValue[n] be N evaluation values (including the evaluation values shown in FIG. 24) calculated above. At this time, the integrated evaluation value can be obtained by $$EvalLayout[l] = \sum_{n=0}^{N} EvalValue[n] \times W[n] \quad (2)$$

where W[n] is the weight of each evaluation value shown in FIG. 24 for each scene. As a feature of this weight, a different weight is set for each layout theme. For example, the themes of the growth record "growth" and travel "travel" are compared, as shown in FIG. 24. For the travel "travel", a number of photos whose quality is as high as possible are laid out in a variety of scenes, and settings are done with a tendency to emphasize the individual evaluation values of the images and the in-page balance evaluation values. On the other hand, for the growth record "growth", whether the main character as the growth record target properly matches each slot is more important than the image variation, and settings are done with a tendency to emphasize the image/slot matching evaluation than in-page balance or the individual evaluation of images.

In step S2109, the layout generation unit 205 generates a layout list LayoutList[k] for layout result display by using EvalLayout[l] calculated in the above-described way. For the layout list, identifier l is stored in descending order of evaluation values out of EvalLayout[l] for a predetermined number of (for example, five) layouts. For example, if the temporary layout created at l=50th time has the highest score, LayoutList[0]=50. Similarly, after LayoutList[1], identifier l for the second highest score is stored.

Figure 29:
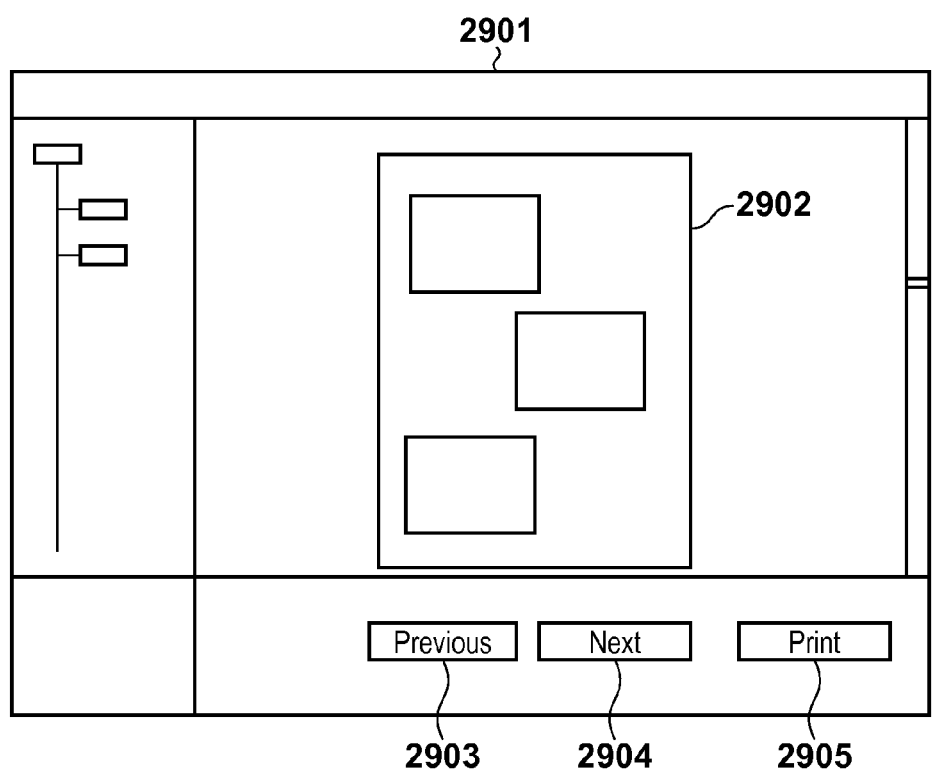
FIG. 29 is a view showing a display example of an automatic layout generation result.

In step S605 of FIG. 6, the rendering unit 206 renders the layout result obtained by the layout generation processing described with reference to FIG. 21, and displays the result. In the embodiment, the rendering result is displayed on a UI 2901 in FIG. 29. In step S605, first, the rendering unit 206 reads out the layout identifier stored in LayoutList[0], and reads out the temporary layout result corresponding to the layout identifier from the secondary storage apparatus 103 or RAM 102. In the layout result, as described above, template information and image names assigned to the respective slots present in the template are set. In step S605, the rendering unit 206 renders the layout result based on these pieces of information using the rendering function of the OS running on the image processing apparatus 115, and displays the rendering result like a layout result 2902 in FIG. 29.

When the user presses a Next button 2904, the identifier of LayoutList[1] with the next score is read out. The layout result is rendered and displayed in the same manner as described above. This allows the user to view variations of proposed layouts. The user can also redisplay the layout displayed previously by pressing a Previous button 2903. If the user likes the displayed layout, he can press a Print button 2905 to cause the printer 112 connected to the image processing apparatus 115 to print the layout result 2902.

Next, control at the time of creating a face dictionary used for personal recognition according to the embodiment will be described in detail.

In the embodiment, category determination conditions to be registered in one of a plurality of types of categories are changed in accordance with the age and sex (individual information) in dictionary registration. For descriptive convenience, the number of categories corresponding to the age will be exemplified.

FIG. 33 is a block diagram showing an example of the arrangement of a face dictionary creation apparatus for personal recognition according to the first embodiment. Note that the building components of the face dictionary creation apparatus may be implemented by hardware, software which is implemented by control of the CPU 100 of the image processing apparatus 115 in FIG. 1, or a combination of the hardware and software.

An image input unit 3301 rasterizes input image data in the RAM 102.

A face detection unit 3302 detects a face in the image data in the RAM 102 that has been processed by the image input unit 3301. The face detection processing has been described in background sensing and database registration, and a description thereof will not be repeated.

A face feature amount extraction unit 3303 receives the image data input from the image input unit 3301, and the face detection position detected by the face detection unit 3302. The face feature amount extraction unit 3303 extracts a face feature amount in a face region based on the face detection position obtained by the face detection unit 3302.

In the embodiment, the face feature amount is a feature amount vector which represents a frequency response to each organ. Note that the face feature amount is not limited to the feature amount vector, and another feature amount may be used. As the face feature amount, a face image may be used. A normalized face image may be created from input image data and a face detection result at the time of extracting a face feature amount, as in step S504 of FIG. 5.

A face dictionary reading unit 3304 searches for face dictionary data present at a designated location in the secondary storage apparatus 103. If there is a face dictionary created in advance, the face dictionary reading unit 3304 reads it. If there is no face dictionary created in advance, the face dictionary reading unit 3304 does not perform face dictionary reading processing. Face feature amount vectors are registered in the face dictionary. The face dictionary save location may be another location. In reading data, the face dictionary reading unit 3304 analyzes face dictionary data and sets the number of registered feature amount vectors.

The structure of the face dictionary will be explained in detail. FIG. 34 is a view showing the inside of the face dictionary. An ID 3401 represents a person identifier. The number of IDs is not particularly limited and is arbitrary. Assume that ID1 indicates a son (child) and ID2 indicates a father (adult) for descriptive convenience. A category (classification) 3402 categorizes and manages feature amounts in accordance with, for example, the age for each person. The number of categories changes depending on the ID. That is, the number of categories associated with each ID changes. Control of the number of categories will be described later. A face feature amount vector 3403 indicates a face feature amount vector extracted by the face feature amount extraction unit 3303. Reference numeral 3404 denotes a face feature amount vector group for each category.

In FIG. 33, a similarity determination unit 3305 receives the face feature amount (face feature amount vector) extracted by the face feature amount extraction unit 3303, and the face dictionary data read by the face dictionary reading unit 3304. In this case, the similarity determination unit 3305 determines a similarity by comparing, as the similarity, distances between the face feature amount vector extracted by the face feature amount extraction unit 3303 and face feature amount vectors registered in the face dictionary. The similarity determination unit 3305 determines that the similarity is higher as the distance between face feature amount vectors is shorter, and lower as the distance is longer. Similarity determination is performed as a round-robin in each category for each ID in FIG. 34. An ID having the shortest distance between face feature amount vectors, and the distance are output. If the calculated distance is equal to or smaller than a predetermined threshold (in other words, the similarity between a face feature vector and another face feature amount vector falls within a predetermined similarity range), the similarity determination unit 3305 determines that these face feature amount vectors represent the same person (same object). If it is determined that these face feature amount vectors represent the same person, the same ID as that of a person determined to be the same is set. If the calculated distance is larger than the predetermined threshold, the similarity determination unit 3305 determines that these face feature amount vectors represent different persons. If it is determined that these face feature amount vectors represent different persons, an unused new ID is set (assigned). Note that the similarity determination method is not limited to this, and another similarity determination method may be used for the determination.

An age determination unit 3306 receives the image data input from the image input unit 3301, and the face detection position (coordinates) detected by the face detection unit 3302. The age determination unit 3306 determines the age of a person in a face region based on the input image data and face detection position.

Note that the age determination method is not particularly limited. For example, an age estimation method disclosed in Japanese Patent Laid-Open No. 2009-271885 is available. According to this method, luminance or edge information in a face region is used as a feature amount, and an age is estimated using a determination unit for each age. As the age estimation feature amount, edge information in a face region is used here. Note that the age estimation method is not limited to this, and another age estimation method and another age estimation feature amount may be used.

As another age determination method, an age is determined using, for example, a table which is registered in advance and associates face regions with ages.

When the user sets birthday information included in the attribute information of FIG. 12, an age may be calculated using capturing information set in capturing information of an image to be used.

A category determination condition setting unit 3307 receives the age determined by the age determination unit 3306. Based on the received age, the category determination condition setting unit 3307 calculates a category similarity determination threshold (category determination condition) to an existing category. The category similarity determination threshold to be set is changed for the categories shown in FIG. 34 in accordance with the age. For example, a child has a more complicated face state than an adult. Thus, when the same recognition processing is performed for a child and adult, the recognition accuracy is increased by setting a larger number of categories of face feature amounts for a child than for an adult. If it is determined as a result of age determination that the age indicates a child, control is performed to subdivide categories to be larger in number for a child than for an adult. More specifically, when the similarity is determined based on the difference between face feature amount vectors, the category similarity determination threshold for an existing category is set to be smaller as the age is earlier and larger as it is older.

For descriptive convenience, the difference between face feature amount vectors is normalized and output in a range of 0 to 255. In this case, as the category determination condition setting method, the category similarity determination threshold is calculated according to the following equation:

$$CategoryTh = BaseTh + (100 - year) \times (255 - BaseTh)/255$$

CategoryTh is a category similarity determination threshold serving as a category determination condition, and BaseTh is a reference similarity determination threshold. The category similarity determination threshold and reference similarity determination threshold may be appropriately set, and are set to, for example, "200" in the embodiment. The determined age is set in year. In the embodiment, the upper limit is "100". The category similarity determination threshold is not limited to one calculated from the above-described equation, but may be one calculated from another equation. An item other than the category similarity determination threshold may be set as a determination condition. A determination condition may be set using a table created in advance.

A category determination unit 3309 receives the following four values. The first value is the category determination condition calculated by the category determination condition setting unit 3307. CategoryTh calculated as a result of age determination is input. The second value is the face feature amount calculated by the face feature amount extraction unit 3303. The third value is the face dictionary read by the face dictionary reading unit 3304. The fourth value is the identifier (ID) determined by the similarity determination unit 3305.

By using the ID obtained from the similarity determination result, a corresponding category is set from the read face dictionary. For all face feature amount vectors in each set category, the distance between input face feature amount vectors is calculated. If the distance is equal to or smaller than a category similarity determination threshold set at this time, an input feature amount vector is additionally registered in an existing category. If the distance is larger than the threshold, a new category is created and the input feature amount vector is newly registered in it. Note that the category similarity determination at the time of setting a corresponding category is not limited to this, and another similarity determination method is usable. For example, a typical feature amount vector may be set for each category to determine a similarity.

Note that the number of categories may be changed in accordance with the used capacity of the face dictionary. For example, CategoryTh may be changed in accordance with the free area of the face dictionary to control the number of categories. The number of categories is set to be large when the free area is large, and small when it is small.

A face dictionary registration unit 3308 receives the face feature amount extracted by the face feature amount extraction unit 3303, the identifier (ID) obtained by the determination by the similarity determination unit 3305, and the category determined by the category determination condition setting unit 3307.

Based the received identifier and category, the face dictionary registration unit 3308 specifies a category to register a face feature amount vector. The face feature amount vector is registered in the specified category.

Note that the upper limit of the number of registered feature amounts may be set for each category. For this purpose, the category determination condition setting unit 3307 sets the maximum number of registered feature amounts for each category in accordance with the age. When adding a feature amount to an existing category upon category determination, if the number of registered feature amounts in the category is smaller than the maximum number of registered feature amounts, the feature amount may be additionally registered. At this time, the maximum number of registered feature amounts is set to be larger for a child than for an adult. The recognition accuracy is improved in comparison with an adult by increasing the number of registered feature amounts.

The maximum number of registered feature amounts in each category may be changed in accordance with the used capacity of the face dictionary. For example, the maximum number of registered feature amounts in each category may be controlled in accordance with the free area of the face dictionary. The maximum number of registered feature amounts is set to be large when the free area is large, and small when it is small.

Although the method of changing the category determination condition in accordance with the age has been described, the category determination condition may be changed in accordance with the sex. The face feature amounts of a female change upon makeup, which influences the recognition accuracy. Hence, by changing the category depending on the sex, high recognition accuracy is ensured. For example, control is performed to subdivide categories to be larger in number for a female than for a male. The sex determination method used here can be, for example, a known technique.

As the sex determination method, a sex may be set from the family relationship set on the UI shown in FIG. 15.

The category determination condition may be changed based on a combination of the age and sex. For example, the recognition accuracy is improved by increasing the number of categories for a child regardless of the sex, and after the childhood, decreasing the number of categories for a male. This is because the face feature amount of a male becomes stable after the childhood, and the recognition accuracy can be ensured with a smaller number of categories than for a female.

The category determination condition may be changed in accordance with the expression in addition to the age. For example, the number of age-based categories may be further increased/decreased in accordance with a smile determination result. Needless to say, another expression determination may be adopted.

Next, the operation procedures of the face dictionary creation apparatus will be described. FIG. 35 is a flowchart showing processing by the face dictionary creation apparatus according to the first embodiment.

First, in step S3501, the image input unit 3301 inputs image data and rasterizes it in the RAM 102.

Then, in step S3502, the face detection unit 3302 detects a face in the image data in the RAM 102 that has been processed by the image input unit 3301.

In step S3503, the face feature amount extraction unit 3303 extracts a face feature amount in the face region based on the face detection position obtained by the face detection unit 3302.

In step S3504, the face dictionary reading unit 3304 reads face dictionary data from a designated location in the secondary storage apparatus 103.

In step S3517, the face dictionary reading unit 3304 determines whether the number of registered feature amounts of the read face dictionary data has reached an arbitrary set upper limit. If the number of registered feature amounts has reached the upper limit (YES in step S3517), the process ends. If the number of registered feature amounts has not reached the upper limit (NO in step S3517), the process advances to step S3505.

In step S3505, the similarity determination unit 3305 calculates a similarity by comparing distances between the face feature amount vector extracted by the face feature amount extraction unit 3303 and face feature amount vectors registered in the face dictionary.

In step S3506, the similarity determination unit 3305 performs a similarity determination in accordance with the calculated similarity.

Then, the similarity determination unit 3305 changes the setting of the identifier (ID) in accordance with the similarity determination result. If it is determined that the face feature amount vector represents a different person, the similarity determination unit 3305 assigns and sets an unused new ID in step S3507. If it is determined that the face feature amount vector represents the same person, the similarity determination unit 3305 sends back in step S3508 the same ID as that of a person determined to be the same.

In step S3509, the age determination unit 3306 determines the age of the person in the face region based on the input image data and face detection position.

In step S3510, the category determination condition setting unit 3307 sets category determination conditions (category similarity determination threshold and the number of registered feature amounts) based on the age determined by the age determination unit 3306. In other words, the category determination conditions are prepared in accordance with the age. For example, when the determined age indicates a child and the currently set category determination conditions are those for an adult, the category determination conditions are changed (set again) to those for a child.

In step S3511, the category determination unit 3309 determines a similarity to a face feature amount of each category in accordance with the set category determination conditions for the identifier (ID) specified by the similarity determination result, and determines the most similar category.

In step S3512, the category determination unit 3309 determines a category for the similarity determination result of the determined most similar category based on the category determination conditions set by the category determination condition setting unit 3307.

If it is determined that there is a category similar to the category of the input face feature amount vector, the face dictionary registration unit 3308 registers the face feature amount vector in the similar existing category in step S3513. If there is no similar category, the face dictionary registration unit 3308 creates a new category and newly registers the face feature amount vector in it in step S3514.

In step S3515, the face dictionary creation apparatus determines whether it has performed a series of processes for all face detection results. If the face dictionary creation apparatus has performed a series of processes for all face detection results, it advances to the next process. If the face dictionary creation apparatus has not performed a series of processes for all face detection results, the process returns to step S3503, and the face dictionary creation apparatus executes the series of processes for an unprocessed face detection result.

In step S3516, the face dictionary creation apparatus determines whether it has performed a series of processes for all set images. If the face dictionary creation apparatus has performed a series of processes for all images, it ends the process. If the face dictionary creation apparatus has not performed a series of processes for all images, the process returns to step S3502, and the face dictionary creation apparatus executes the series of processes for an unprocessed image.

As described above, according to the first embodiment, a high-accuracy face dictionary can be created by setting (changing) category determination conditions in accordance with at least one of the age and sex in face dictionary registration. As a result, the recognition accuracy can be increased.

When performing personal recognition, the shapes of organs, the positional relationship between them, and the like change depending on the expression, age, and the like, so the feature amounts change complicatedly. The number of possible patterns of a person's face changes depending on the age and sex. For example, the movable ranges of organs are wide for a child, so the number of possible patterns becomes large. Also, the feature amounts of a female change depending on whether she puts on makeup, and thus the number of possible patterns becomes large.

The first embodiment can therefore increase the recognition accuracy by setting category determination conditions in accordance with the age and sex of an object, categorizing similar feature amounts, and registering them in a dictionary.

Although it is controlled to increase the number of categories for a female than for a male in the embodiment, the present invention is not limited to this. For example, the user may be allowed to register information about whether to put on makeup, and the number of categories may be increased in accordance with the information.

Second Embodiment

The second embodiment will describe an arrangement in which category determination conditions to be registered are changed in accordance with the age and sex set (individual information setting) from an external input apparatus in dictionary registration. For descriptive convenience, the number of categories is changed as the category determination condition. An information processing apparatus for implementing an image processing apparatus in the second embodiment is the same as that in the first embodiment, and a description thereof will not be repeated.

Figure 36:
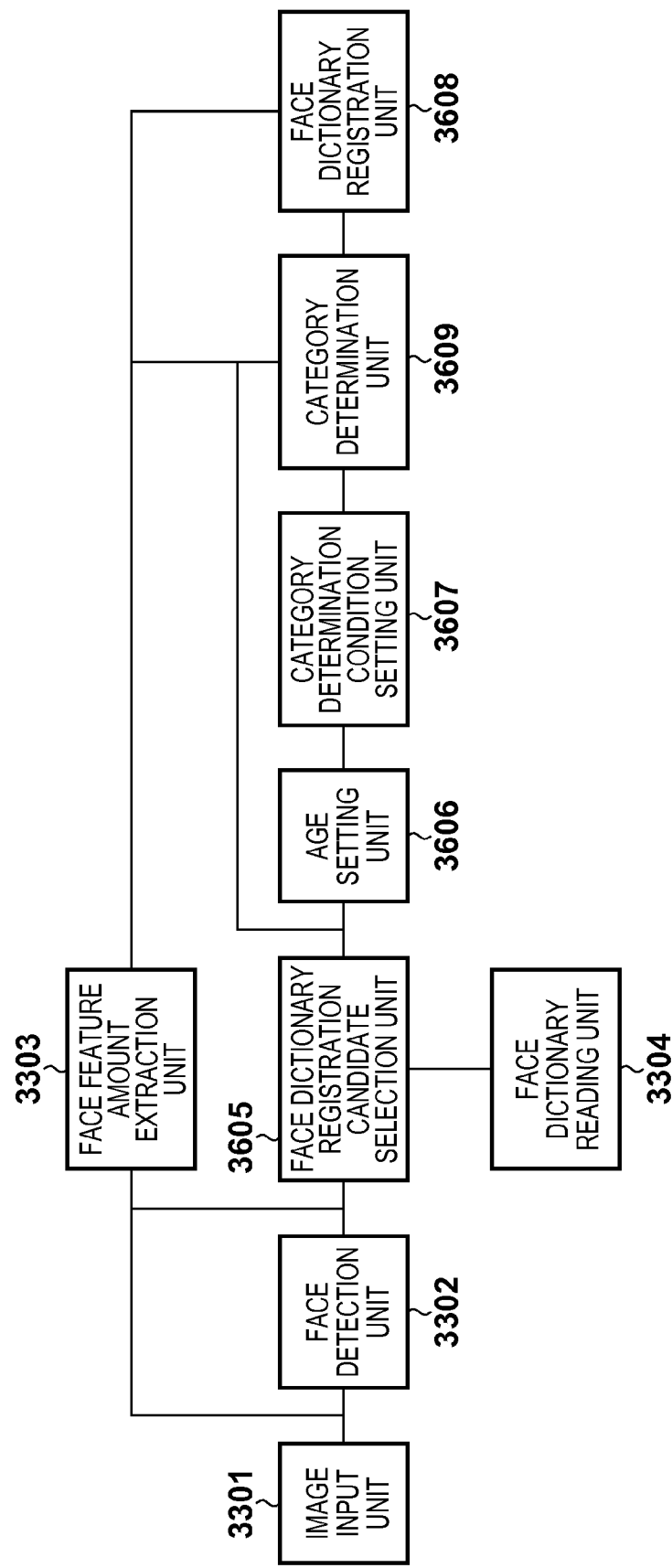
FIG. 36 is a block diagram for explaining a face dictionary creation apparatus.

FIG. 36 is a block diagram showing an example of the arrangement of a face dictionary creation apparatus for personal recognition according to the second embodiment. The same reference numerals as those in FIG. 33 according to the first embodiment denote the same parts, details thereof will not be repeated, and only parts different from the first embodiment will be explained.

A face dictionary registration candidate selection unit 3605 displays a detected face position plotted in input image data on a display apparatus 104 based on image data input from an image input unit 3301, and a face detection position obtained by a face detection unit 3302. When a plurality of face regions are detected from the input image data, the face dictionary registration candidate selection unit 3605 allows the user to explicitly select a face region to be processed.

Although a face region upon detecting a face has been described here, the user may manually set a rectangle to set a face region.

Figure 37:
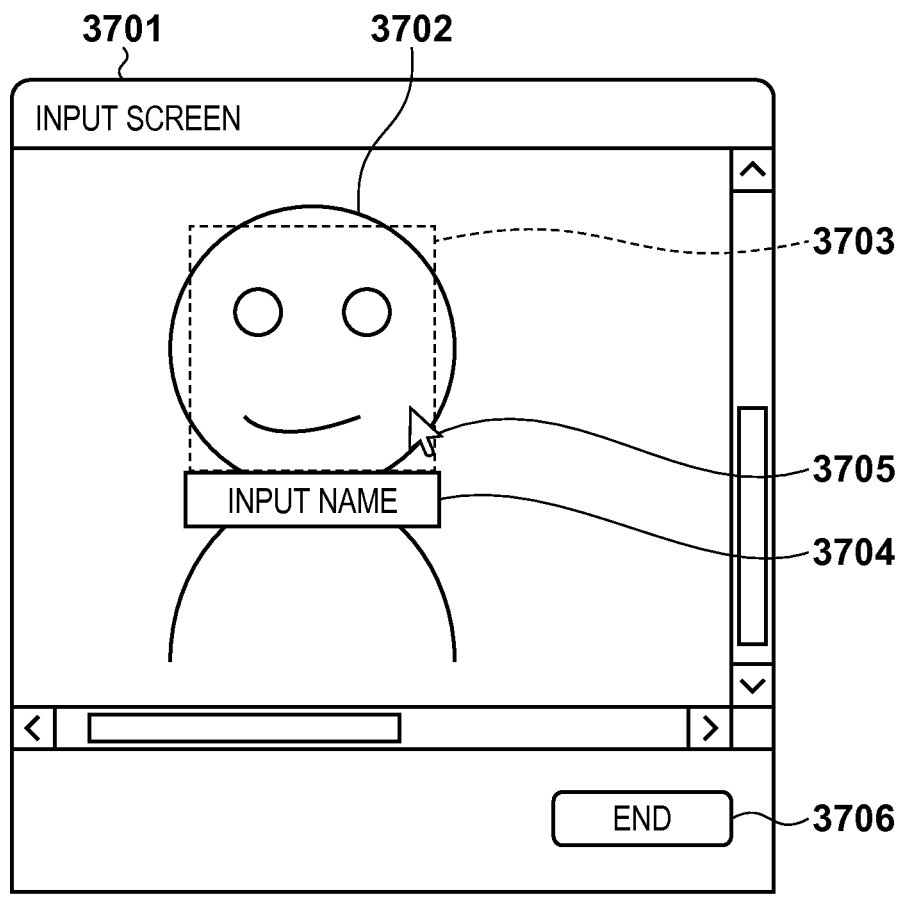
FIG. 37 is a view showing an example of the UI of a face dictionary registration candidate selection screen.

FIG. 37 shows an example displayed on the display apparatus 104 by the face dictionary registration candidate selection unit 3605. An application window 3701 is used for display on the display apparatus 104. In a region 3702, input image data is displayed. A detection result 3703 is obtained by the face detection unit 3302. Reference numeral 3704 denotes a name input area. A pointer 3705 is operable using an input apparatus 105 such as a mouse. An end button 3706 is selected to end selection of a face dictionary registration candidate. As a matter of course, a face dictionary registration candidate may be selected using another user interface.

In FIG. 37, the user selects, from the face detection result in the displayed input image data, a face region to be registered in the face dictionary with the pointer 3705 by using the input apparatus 105 such as a mouse. When the selected face region becomes active, the name input area 3704 enables input, and the user inputs a name by using the input apparatus 105 such as a keyboard. Upon completion of the input, it is considered that a face dictionary registration candidate has been selected.

A case in which the name input by the user is limited to a numerical value and directly used for an ID managed in the face dictionary will be exemplified below. Note that the name input and ID are not limited to them. It is also possible to permit arbitrary characters as the name input, separately assign an ID for internal management, and manage the correspondence.

Referring back to FIG. 36, an age setting unit 3606 functions as an individual information setting unit. The age setting unit 3606 sets an age for a face region selected by the face dictionary registration candidate selection unit 3605.

FIG. 38 shows an example displayed on the display by the age setting unit 3606. The same user interface as that of the face dictionary registration candidate selection unit 3605 shown in FIG. 37 is employed to simplify the description, but an age may be set using another user interface.

In FIG. 38, the same reference numerals as those in FIG. 37 denote the same parts, and a description thereof will not be repeated. An age list 3801 is used to select an age group. The age list 3801 may use a feature such as the sex or expression, as a matter of course.

The age setting is described by the range, but may be set in detail by user input or the like. Not only the age but also the sex may be set.

After the face dictionary registration candidate selection unit 3605 shown in FIG. 37 selects a face dictionary registration candidate, the age list 3801 automatically pops up and is displayed, as shown in FIG. 38. The user selects an age from the age list 3801 by using the input apparatus 105 such as a mouse. The age setting unit 3606 converts the selected age into a category managed in the face dictionary.

Referring back to FIG. 36, a category determination condition setting unit 3607 sets a category determination condition based on the age set by the age setting unit 3606. The category determination condition has been described in the first embodiment, and a description thereof will not be repeated.

A category determination unit 3609 receives an identifier (ID) set by the face dictionary registration candidate selection unit 3605, category determination conditions set by the category determination condition setting unit 3607, and a face feature amount calculated by a face feature amount extraction unit 3303. Based on these inputs, the category determination unit 3609 determines a category in face dictionary registration. The category determination has been described in the first embodiment, and a description thereof will not be repeated.

A face dictionary registration unit 3608 receives the identifier (ID) set by the face dictionary registration candidate selection unit 3605, the category determined by the category determination unit 3609, and the face feature amount calculated by the face feature amount extraction unit 3303. Based on the received identifier (ID) and category, the face dictionary registration unit 3608 registers the face feature amounts in the face dictionary.

Figure 39:
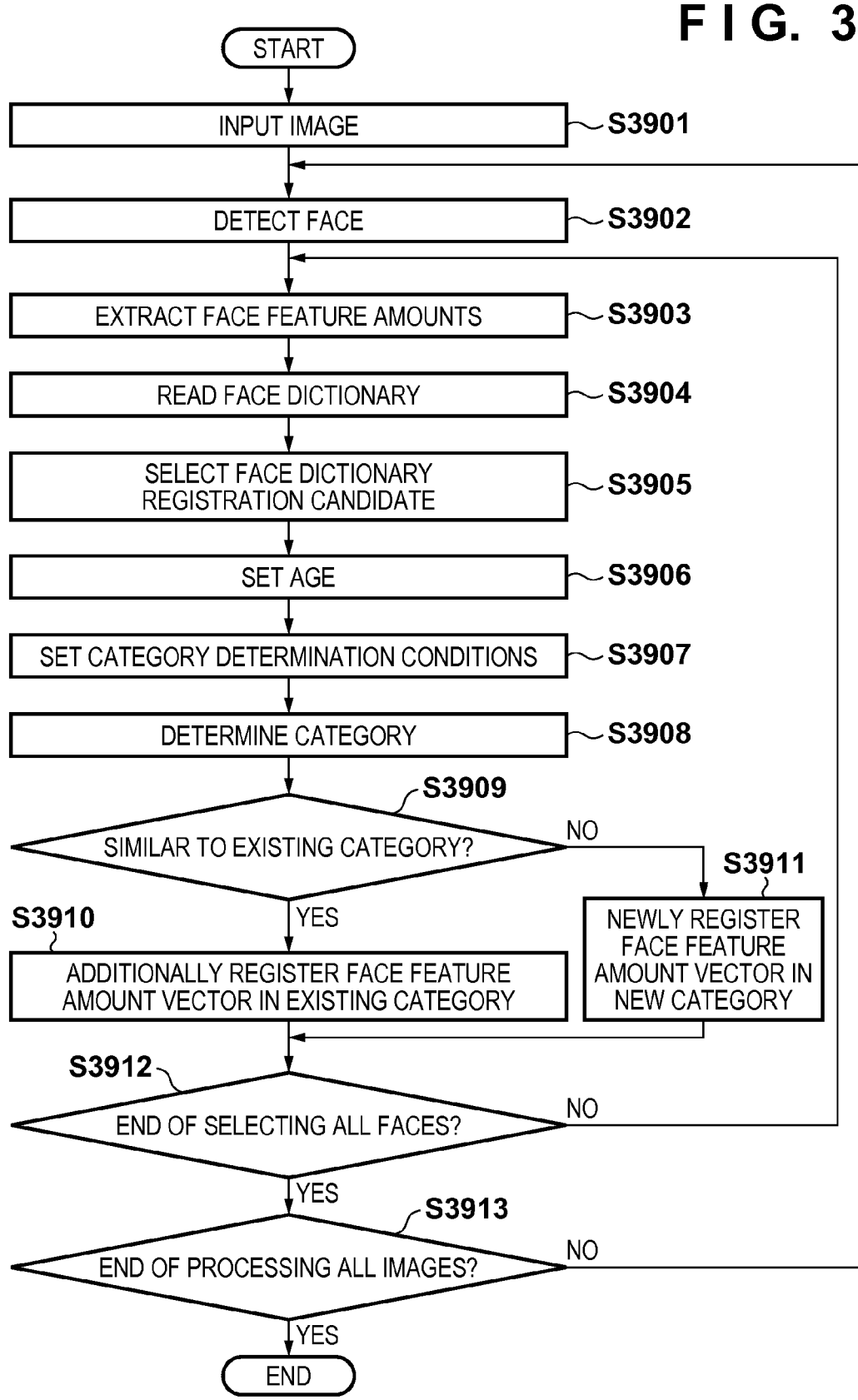
FIG. 39 is a flowchart showing face dictionary creation processing.

Next, the operation procedures of the face dictionary creation apparatus will be described. FIG. 39 is a flowchart showing processing by the face dictionary creation apparatus according to the second embodiment.

First, in step S3901, the image input unit 3301 inputs image data and rasterizes it in a RAM 102.

Then, in step S3902, the face detection unit 3302 detects a face in the image data in the RAM 102 that has been processed by the image input unit 3301.

In step S3903, the face feature amount extraction unit 3303 extracts a face feature amount in the face region based on the face detection position obtained by the face detection unit 3302.

In step S3904, the face dictionary reading unit 3304 reads face dictionary data from a designated location in a secondary storage apparatus 103.

In step S3905, the face dictionary registration candidate selection unit 3605 selects a face detection result to be registered in the face dictionary.

In step S3906, the age setting unit 3606 sets an age for the selected face detection result.

In step S3907, the category determination condition setting unit 3607 sets category determination conditions based on the age set by the age setting unit 3606.

In step S3908, the category determination unit 3609 determines a similarity to a feature amount of each category for an ID specified by the similarity determination result, and determines the most similar category.

In step S3909, the category determination unit 3609 determines whether the target category is similar to an existing category. More specifically, based on the category determination conditions set by the category determination condition setting unit 3607, the category determination unit 3609 determines whether the similarity determination result of the determined most similar category exhibits a similarity to an existing category.

If it is determined that there is a category similar to the category of the input face feature amount vector, the face dictionary registration unit 3608 registers the face feature amount vector in the similar existing category in step S3910. If there is no similar category, the face dictionary registration unit 3608 creates a new category and newly registers the face feature amount vector in it in step S3911.

In step S3912, based on whether the user has pressed the end button 3706 in FIG. 37, the face dictionary creation apparatus determines whether the selection of a face dictionary registration dictionary has ended. If the user has not pressed the end button 3706, the process returns to step S3903. If the user has pressed the end button 3706, the process advances to step S3913. Also when all face detection results have been registered in the face dictionary, the face dictionary creation apparatus ends the selection of a face dictionary registration candidate and advances to the next process.

In step S3913, the face dictionary creation apparatus determines whether all images including faces to be registered in the face dictionary have been processed. If all images have been processed, the process ends. If all images have not been processed, the process returns to step S3902, and the face dictionary creation apparatus executes the series of processes for the next image.

As described above, according to the second embodiment, a high-accuracy face dictionary can be created by setting (changing) category determination conditions in accordance with an age and sex selected by the user in face dictionary registration. The recognition accuracy can therefore be increased.

Other Embodiments

The above-described embodiments are examples for obtaining the effects of the present invention. If the same effects as those of the present invention are obtained by using another similar method or different parameters, this also falls within the scope of the invention.

The above embodiments have described an example of generating, as a layout output, an output in which a plurality of images are arranged on one page. However, the present invention is also applicable to output of an album including a plurality of pages.

Embodiments of the present invention can also be realized by a computer of a system or apparatus that reads out and executes computer executable instructions recorded on a storage medium (for example, non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154009, filed Jul. 9, 2012, which is hereby incorporated by reference herein in its entirety.

What is claimed is:

1. An image processing apparatus comprising:
an extraction unit configured to extract, from an image, face feature information of a face of an object included in the image;
a management unit configured to manage, in a dictionary, face feature information for each category;
a specifying unit configured to specify individual information which represents at least one of an age and sex of the object;
a condition setting unit configured to set category determination conditions which include a range of a category similarity, in accordance with the individual information specified by said specifying unit;
a determination unit configured to determine, based on the category determination conditions set by said condition setting unit, a similarity between the face feature information extracted by said extraction unit and the face feature information of each category which is managed by said management unit in the dictionary; and
a registration unit configured to register the face feature information extracted by said extraction unit into the category, in the dictionary, to which the managed face feature information being determined to be similar to the face feature information extracted by said extraction unit belongs,
wherein the category determination conditions depend on the individual information.

2. The apparatus according to claim 1, wherein said condition setting unit changes, out of the determination conditions in accordance with the individual information, a category similarity determination criterion used for the category determination.

3. The apparatus according to claim 1, wherein said condition setting unit changes, out of the category determination conditions in accordance with the individual information, the maximum number of registration feature information to be registered in a category of the dictionary.

4. The apparatus according to claim 1, further comprising an individual information setting unit configured to set the individual information representing at least one of the age and sex of the object.

5. The apparatus according to claim 1, further comprising a selection unit configured to, if a face detection unit detects a plurality of face regions of the face, select a face region serving as a registration candidate in the dictionary from the plurality of face regions.

6. An image processing method comprising:
extracting, from an image, face feature information of a face of an object included in the image;
managing, in a dictionary feature information for each category;
specifying individual information which represents at least one of an age and sex of the object;
setting category determination conditions which include a range of a category similarity in accordance with the individual information specified by said specifying step;
determining, based on the category determination conditions set in said setting step, a similarity between the face feature information extracted by said extracting step and the face feature information of each category which is managed by said managing step in the dictionary; and
registering the face feature information extracted by said extracting step into the category, in the dictionary, to which the managed face feature information being determined to be similar to the face feature information extracted by said extracting step belongs,
wherein the category determination conditions depend on the individual information.

7. A non-transitory computer-readable storage medium storing a program for causing a computer to control an image processing apparatus, the program causing the computer to function as
an extraction unit configured to extract, from an image, face feature information of a face of an object included in the image;
a management unit configured to manage, in a dictionary, face feature information for each category,
a specifying unit configured to specify individual information which represents at least one of an age and sex of the object;
a condition setting unit configured to set category determination conditions which include a range of a category similarity, in accordance with the individual information specified by said specifying unit,
a determination unit configured to determine, based on the category determination conditions set by said condition setting unit, a similarity between the face feature information extracted by said extraction unit and the face feature information of each category which is managed by said management unit in the dictionary; and
a registration unit configured to register the face feature information extracted by said extraction unit into the category, in the dictionary, to which the managed face feature information being determined to be similar to the face feature information extracted by said extraction unit belongs, wherein the category determination conditions depend on the individual information.

8. The apparatus according to claim 2, wherein said condition setting unit sets, if it is specified that the object is a child based on the individual information, a smaller range of the category similarity than for an adult.

9. The apparatus according to claim 2, wherein said condition setting unit sets, if the individual information represents the age of the object and the object comprises a person, a smaller range of the category similarity for a younger person than for an older person older than the younger person.

10. The apparatus according to claim 2, wherein said registration unit registers the face feature information extracted by said extraction unit into the category for which the similarity is included in the range if the similarity is included in the range, and said registration unit generates a new category and registers the face feature information extracted by said extraction unit into the new category if the similarity is not included in the range.

11. The apparatus according to claim 3, wherein said management unit associates face feature information of a single object with plural categories, and the maximum number of categories which are allowed to be associated with the face feature information of the single object is set according to the age of the object.

12. The apparatus according to claim 3, wherein said management unit associates face feature information of a single object with plural categories, and the maximum number of categories which are allowed to be associated with the face feature information of the single object is set according to the used capacity of the dictionary.

13. The apparatus according to claim 3, wherein said management unit associates face feature information of a single object with plural categories, and the maximum number of categories which are allowed to be associated with the face feature information of the single object is set to be larger if the object is a child than if the object is an adult.

14. The apparatus according to claim 2, wherein said condition setting unit sets, if the individual information represents the sex of the object, a smaller range of the category similarity for a female than for a male.

15. The apparatus according to claim 1, wherein the face feature information is a feature amount.

16. The apparatus according to claim 1, wherein the dictionary is used for personal recognition.

17. The method according to claim 6, wherein said condition setting step changes, out of the determination conditions in accordance with the individual information, a category similarity determination criterion used for the category determination.

18. The method according to claim 6, wherein said condition setting step changes, out of the category determination conditions in accordance with the individual information, the maximum number of registration feature information to be registered in a category of the dictionary.

19. The method according to claim 17, wherein said condition setting step sets, if it is specified that the object is a child based on the individual information, a smaller range of the category similarity than for an adult.

20. The method according to claim 17, wherein said condition setting step sets, if the individual information represents the age of the object and the object comprises a person, a smaller range of the category similarity for a younger person than for an older person older than the younger person.

21. The method according to claim 17, wherein said registration step registers the face feature information extracted by said extraction unit into the category for which the similarity is included in the range if the similarity is included in the range, and said registration step generates a new category and registers the face feature information extracted by said extraction unit into the new category if the similarity is not included in the range.

22. The method according to claim 18, wherein said management step associates face feature information of a single object with plural categories, and the maximum number of categories which are allowed to be associated with the face feature information of the single object is set according to the age of the object.

23. The method according to claim 18, wherein said management step associates face feature information of a single object with plural categories, and the maximum number of categories which are allowed to be associated with the face feature information of the single object is set according to the used capacity of the dictionary.

24. The method according to claim 18, wherein said management step associates face feature information of a single object with plural categories, and the maximum number of categories which are allowed to be associated with the face feature information of the single object is set to be larger if the object is a child than if the object is an adult.

* * * * *